(12) United States Patent
Harris

(10) Patent No.: US 10,207,344 B2
(45) Date of Patent: Feb. 19, 2019

(54) ATTACHABLE AND EXTENDABLE SAW AND METHODS FOR USING SAME

(71) Applicant: Will Harris, Houston, TX (US)

(72) Inventor: Will Harris, Houston, TX (US)

(73) Assignee: Mechanical & Electrical Concepts, Inc., Houston, TX (US)

( * ) Notice: Subject to any disclaimer, the term of this patent is extended or adjusted under 35 U.S.C. 154(b) by 0 days.

(21) Appl. No.: 15/194,111

(22) Filed: Jun. 27, 2016

(65) Prior Publication Data

US 2017/0368618 A1 Dec. 28, 2017

(51) Int. Cl.
*B26D 3/06* (2006.01)
*B23D 45/00* (2006.01)
*B23D 45/02* (2006.01)

(52) U.S. Cl.
CPC ......... *B23D 45/006* (2013.01); *B23D 45/003* (2013.01); *B23D 45/021* (2013.01)

(58) Field of Classification Search
CPC ... B23D 45/006; B23D 45/003; B23D 45/021
USPC .......................................................... 83/875
See application file for complete search history.

(56) References Cited

U.S. PATENT DOCUMENTS

| | | | | |
|---|---|---|---|---|
| 2,248,694 A | * | 7/1941 | Boyette | B23D 45/003 144/115 |
| 2,512,970 A | * | 6/1950 | Rogne | B27B 5/08 403/360 |
| 2,982,320 A | * | 5/1961 | Trumbull | B23D 57/0076 144/119.1 |
| 3,111,969 A | * | 11/1963 | Bivens | B27B 5/08 144/2.1 |
| 4,570,609 A | | 2/1986 | Hogue | |
| 4,572,303 A | * | 2/1986 | Marechal | B27B 17/0091 173/39 |
| 4,972,588 A | * | 11/1990 | Briach, Sr. | B27B 9/02 30/388 |
| 5,012,582 A | * | 5/1991 | Bristol | B23D 45/16 30/390 |
| 5,013,092 A | | 5/1991 | Kulhawy | |
| 5,142,825 A | * | 9/1992 | Floyd | B23D 45/006 30/102 |
| 5,545,079 A | * | 8/1996 | Larsson | B23D 45/006 125/13.01 |
| 5,784,789 A | * | 7/1998 | Vargas | B27B 5/08 30/276 |

(Continued)

FOREIGN PATENT DOCUMENTS

WO PCT/US2015/024986 10/2015
WO WO 2015/157457 A1 10/2015

*Primary Examiner* — Ghassem Alie
*Assistant Examiner* — Bharat C Patel
(74) *Attorney, Agent, or Firm* — Christopher A. Taravella

(57) ABSTRACT

An attachable and extendable saw and methods for cutting objects with the attachable and extendable saw are provided. The attachable and extendable saw can include a blade housing coupled to a main body. The blade housing at least partially covers a saw blade and the extendable member can be configured to move the saw blade with or without the blade housing between a retracted position and an extended position relative to the main body. The extendable saw can also include means to drive the saw blade, means to drive the extendable member, and means for attaching the attachable and extendable saw to the objects to be cut.

14 Claims, 15 Drawing Sheets

(56) References Cited

U.S. PATENT DOCUMENTS

| | | | |
|---|---|---|---|
| 5,815,932 A | 10/1998 | Presher | |
| 5,967,013 A * | 10/1999 | McKenzie | B27B 5/08 30/290 |
| 5,974,674 A | 11/1999 | Kelly | |
| D423,898 S | 5/2000 | Kelley | |
| 6,158,817 A * | 12/2000 | Bertrand | B28D 1/045 299/36.1 |
| 6,161,293 A | 12/2000 | Watson | |
| 6,588,111 B2 * | 7/2003 | Williams | B27B 5/08 30/276 |
| 6,678,960 B2 * | 1/2004 | Williams | B27B 5/08 30/373 |
| 7,186,170 B2 | 3/2007 | Harwath-Seyfried | |
| 7,739,802 B2 * | 6/2010 | Crain | B23D 59/006 30/166.3 |
| 7,891,101 B2 * | 2/2011 | Brady | B23D 45/003 144/136.1 |
| 8,118,018 B1 * | 2/2012 | Sherment | B28D 1/046 125/13.01 |
| 8,291,563 B2 * | 10/2012 | Harris | B23K 37/0408 269/17 |
| 8,302,519 B2 * | 11/2012 | McCracken | B23D 45/042 30/390 |
| 8,413,645 B2 * | 4/2013 | Donnerdal | B23D 47/12 125/13.01 |
| 8,438,960 B2 * | 5/2013 | Booms | B26D 1/1575 83/318 |
| 8,671,581 B2 | 3/2014 | Crain | |
| 8,839,778 B2 | 9/2014 | Smith | |
| 9,108,334 B2 | 8/2015 | Plonsky | |
| 2002/0092393 A1 * | 7/2002 | Mains | B23D 45/021 83/167 |
| 2004/0103771 A1 * | 6/2004 | Lin | B23D 45/021 83/386 |
| 2005/0097760 A1 * | 5/2005 | McDonnell | A61F 15/02 30/388 |
| 2006/0156877 A1 * | 7/2006 | Plonsky | B27B 5/08 83/13 |
| 2008/0163492 A1 | 7/2008 | Johansson | |
| 2008/0264225 A1 | 10/2008 | Crain | |
| 2010/0162867 A1 | 7/2010 | McCracken et al. | |
| 2011/0271805 A1 * | 11/2011 | Abadie | B23D 45/003 83/13 |
| 2013/0098346 A1 | 4/2013 | South | |
| 2015/0113814 A2 * | 4/2015 | Cuzdey | B27B 9/02 30/376 |
| 2015/0313097 A1 * | 11/2015 | LaTendresse | A01G 23/091 83/13 |

* cited by examiner

ATTACHABLE AND EXTENDABLE SAW AND METHODS FOR USING SAME

BACKGROUND OF THE INVENTION

Field of the Invention

Embodiments generally relate to apparatuses and methods for metal working. More particularly, such embodiments relate to an attachable and extendable saw and method for using same.

Description of the Related Art

In the course of metal working or fabrication, metal objects such as key plates, angle irons, and handrails are often cut from a metal deck or surface. Such cuts are rarely flush with the metal deck or surface and further processing must be undertaken in order to produce a surface free of remnants from the metal object. The task of later smoothing out the deck or surface is generally difficult and time consuming or may leave an unsafe environment until adequate time, tools, and/or skilled workers are available to smooth the surface.

There is a need, therefore, for an attachable and extendable saw and methods for using same.

BRIEF SUMMARY OF THE INVENTION

An attachable and extendable saw and method for using same are provided. In one or more embodiments, an attachable and extendable saw can include a main body and a blade housing coupled to the main body. An extendable member may couple the blade housing to the main body. Or the extendable member may couple a saw blade to the main body. The blade housing at least partially covers a saw blade and the extendable member can be configured to move the blade housing and the saw blade between a retracted position and an extended position relative to the main body. Or the extendable member can be configured to move the saw blade but not the blade housing between a retracted position and an extended position relative to the main body. The extendable saw can also include a motorized unit coupled to the saw blade, configured to rotate or provide other blade movement to the saw blade and one or more magnets disposed on the main body that can include at least one contact surface. The contact surface of the magnet(s) may or may not be adjustable or switchable between a magnetized state and a non-magnetized state.

In some embodiments, the magnet can be a switchable permanent magnet, a non-switchable magnet, an electromagnet, or hybrid electro-permanent magnet. An electromagnet can be in electrical communication with a switch and configured to control the magnetized state and the non-magnetized state of the contact surface. In some examples, a control system can be operatively coupled to at least the motorized unit and the magnet. The control system can be configured to activate the magnetized state of the contact surface prior to activating the rotation or other blade movement of the saw blade via the motorized unit. The control system can also be configured to deactivate the rotation or other blade movement of the saw blade prior to deactivating the magnetized state (or activating the demagnetized state).

In other embodiments, a switchable permanent magnet can include a magnet housing, one or more permanent magnets disposed within the magnet housing and configured to provide the magnetized state and the non-magnetized state of the contact surface, and a switch or a lever extending from the magnet housing and configured to cause relative rotation of the permanent magnet(s) for controlling the magnetized state and the non-magnetized state of the contact surface.

In one or more embodiments, a method for removing an object protruding from a work surface with an extendable saw can include positioning the extendable saw on or adjacent to the work surface. The extendable saw can include: a blade housing coupled to a main body, where the blade housing at least partially covers a saw blade (the extendable member can be configured to move the blade housing and the saw blade between a retracted position and an extended position relative to the main body, or the extendable member can be configured to move the saw blade but not the blade housing between a retracted position and an extended position relative to the main body); a motorized unit coupled to the saw blade and configured to rotate or provide other blade movement to the saw blade; and means for attaching the extendable saw to the work surface. Such means for attaching may include vacuum means or one or more magnets disposed on the main body and having at least one contact surface.

With respect to means for attaching the extendable saw to the work surface by one or more switchable permanent magnet(s), the method can further include attaching the extendable saw to the work surface. The method may also include rotating or providing other blade movement to the saw blade via the motorized unit and extending or otherwise moving the blade housing and the saw blade, or the saw blade alone, from the retracted position toward the object protruding from the work surface, where the object can be disposed to, from, and/or between the retracted and extended positions. The method can further include cutting through the object with the saw blade to separate the object from the work surface.

In some embodiments, the method can also include maintaining a blade guard in a stationary position as the blade housing and the saw blade, or the saw blade alone, extend from the retracted position so that the saw blade can be at least partially revealed within a cutting window of the blade housing as the blade housing and the saw blade, or the saw blade alone, moves away from the blade guard and the main body. In other embodiments, the method can also include retracting or otherwise moving the blade housing and the saw blade, or the saw blade alone, to the retracted position subsequent to cutting through the object. In some embodiments, the method can also include maintaining a blade guard in a stationary position as the blade housing and the saw blade, or the saw blade alone, move towards the retracted position so that the saw blade can be at least partially concealed by the blade guard within the cutting window as the saw blade moves towards the blade guard and the main body.

In one or more embodiments, the attachable and extendable saw can include a main body and a blade housing coupled to the main body, where the blade housing at least partially covers a saw blade. An extendable member can couple the blade housing to the main body. Or the extendable member can couple a saw blade to the main body. The extendable member can be configured to move the blade housing and the saw blade, or the saw blade alone, between a retracted position and an extended position relative to the main body. A motorized unit can be coupled to the saw blade and can be configured to drive the saw blade. One or more switchable permanent magnet(s) can be disposed on the main body and can include at least one contact surface that can be switchable between a magnetized state and a non-magnetized state. Control system means can be operatively coupled to the extendable member, the motorized unit, and the permanent switchable magnet.

In other embodiments, the attachable and extendable saw can include an extendable member coupled to and between a main body and a blade housing or couple to and between the main body and a saw blade. The extendable member can be configured to move the blade housing and a saw blade, or the saw blade alone, between a retracted position and an extended position relative to the main body. The extendable member can include a first segment coupled to the main body and a second segment coupled to the blade housing or to the saw blade. The extendable saw can also include actuator means configured to drive the extendable member for moving the blade housing and the saw blade, or the saw blade alone, between the retracted position and the extended position. Such actuator means may be manual and include a hand crank or lever used to provide an accurate linear motion. Gear reduction means may be used such that a large manual motion of the hand crank or lever results in a very small, finite, and accurate translation of the extendable member. This may be accomplished for example and without limitation with a pinion gear coupled to the first segment of the extendable member and a rack gear coupled to the second segment of the extendable member or other similar drive mechanisms well known in the art, for example and without limitation, friction disks, hydraulic or pneumatic mechanisms, solenoids, clutch mechanisms, worm drives, and chain and sprocket drives. Therefore, such actuator means may be by manual operation or such actuator means may be effected using an actuator motor or other driving means operatively coupled to the rack gear and the pinion gear and configured to drive the extendable member. The extendable member can also include a motorized unit coupled to the saw blade and configured to drive the saw blade and a switchable permanent magnet disposed on the main body and having at least one contact surface that can be switchable between a magnetized state and a non-magnetized state.

In some embodiments, the attachable and extendable saw can include a blade housing coupled to a main body by an extendable member, or a saw blade coupled to a main body by an extendable member, where the blade housing at least partially covers a circular saw blade and the extendable member can be configured to move the blade housing and the circular saw blade, or the saw blade alone, between a retracted position and an extended position relative to the main body. The extendable saw can include a motorized unit coupled to the circular saw blade and configured to drive the circular saw blade with one or more switchable permanent magnet(s) disposed on the main body and having at least one contact surface that can be adjustable or switchable between a magnetized state and a non-magnetized state. The extendable saw can also include control system means operatively coupled to the extendable member, the motorized unit, and the switchable magnet(s), where the control system means can be configured to maintain or place the extendable member in the retracted position if contact with the contact surface is not present or lost.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only a few of several typical embodiments and are therefore not to be considered limiting of its scope, for the invention may admit to other equally effective embodiments.

DETAILED DESCRIPTION OF THE INVENTION

Figure 1A:
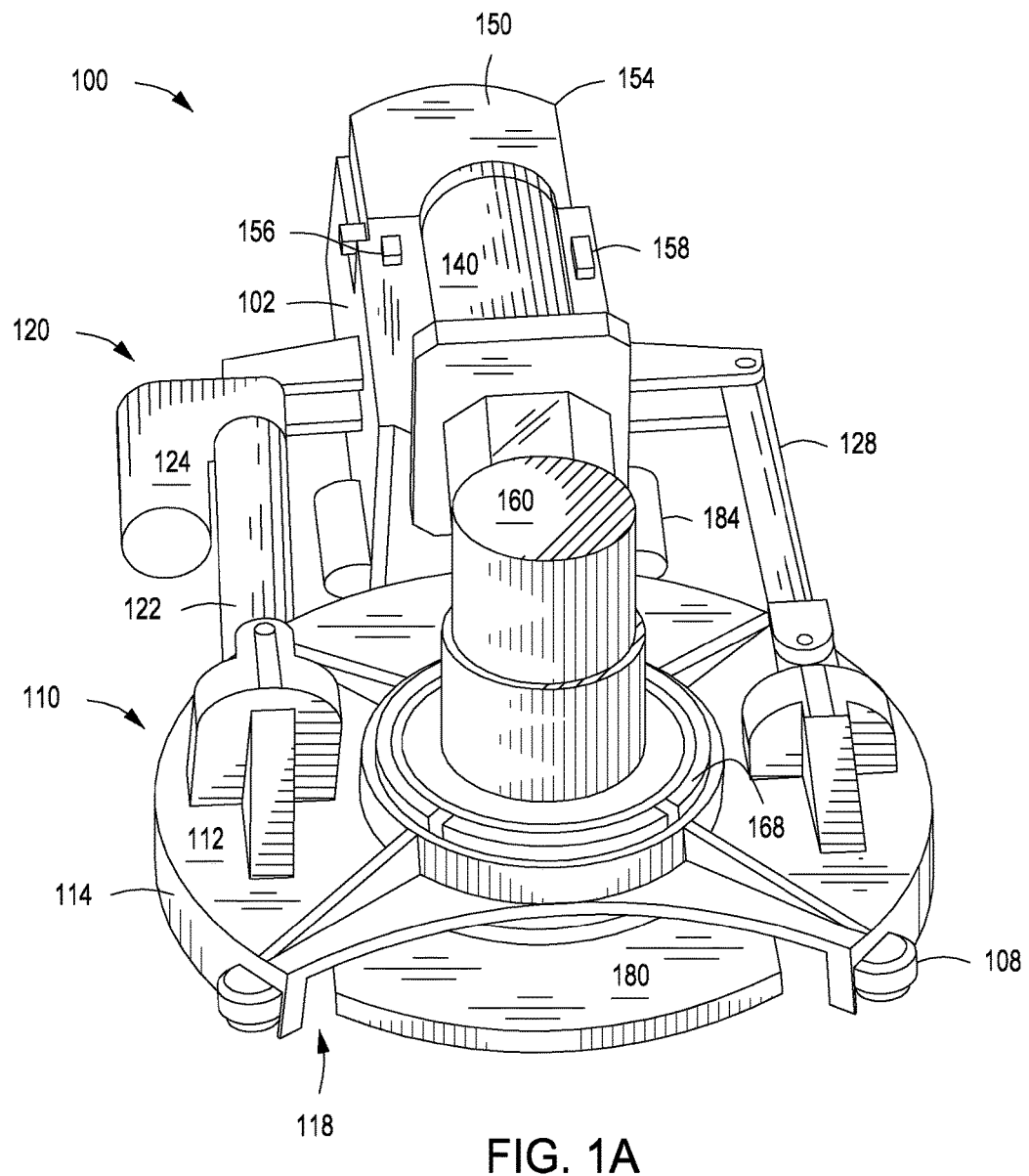
FIGS. 1A-1C depict perspective views of an illustrative magnetically attachable and extendable saw, according to one or more embodiments described.
Figure 1B:
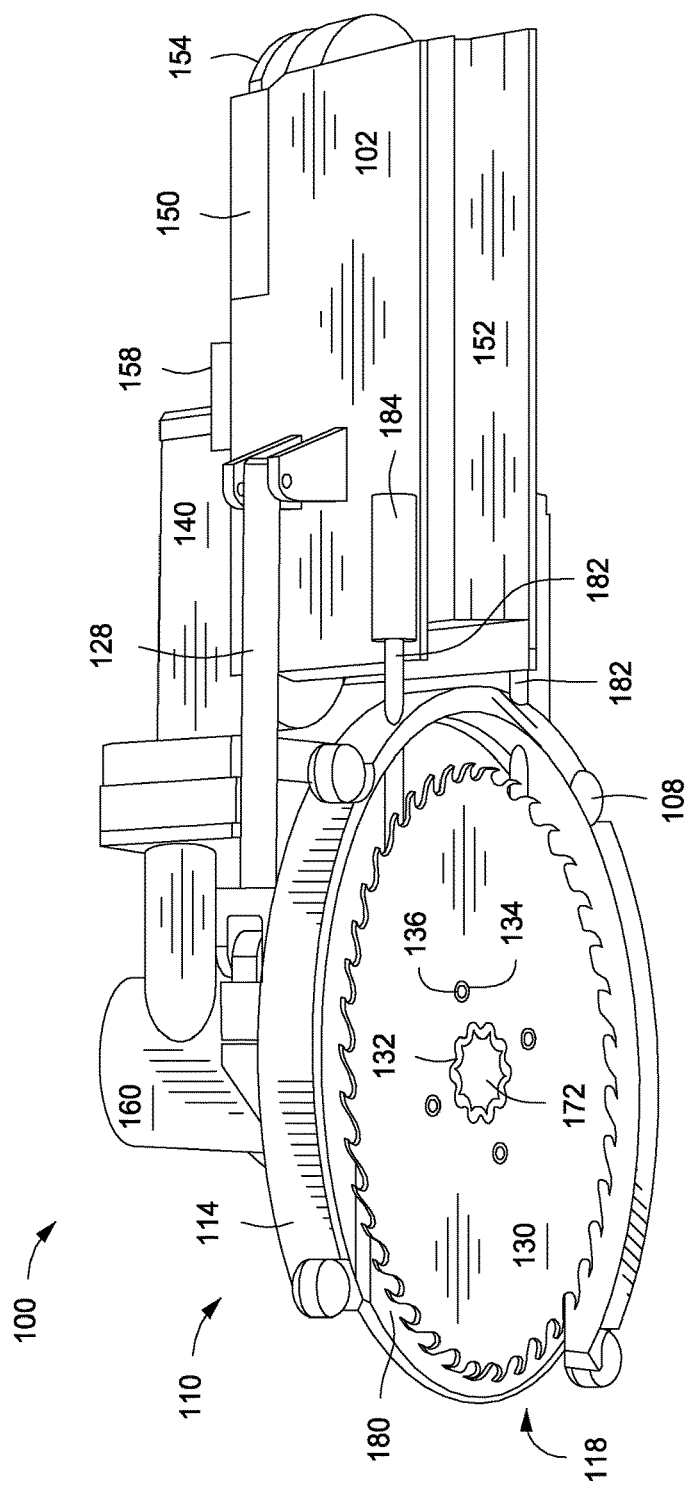
Figure 1C:
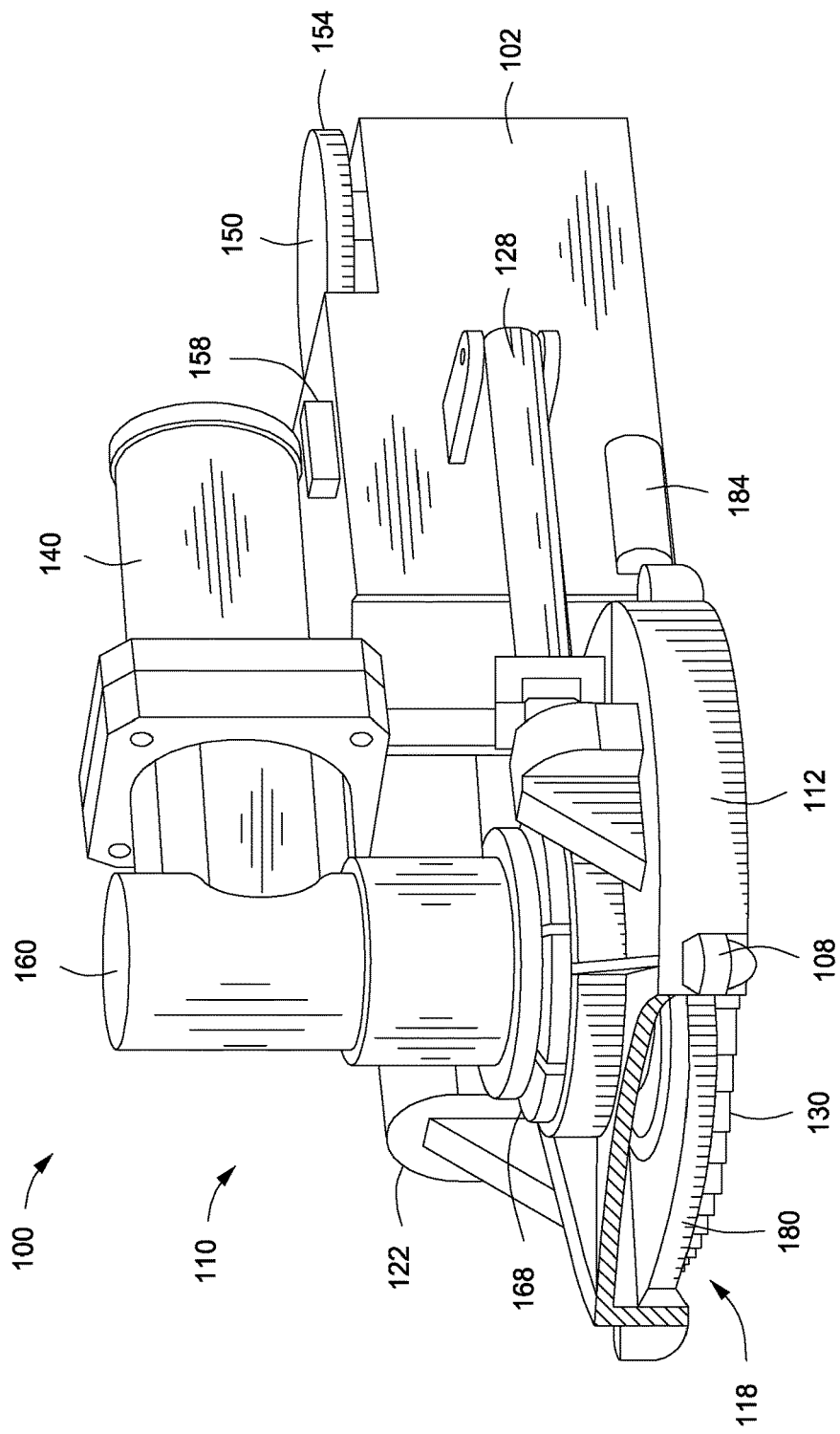

Means for attaching the extendable saw to a work surface may vary. FIGS. 1A-1C depict perspective views of an illustrative magnetically attachable and extendable saw 100, according to one or more embodiments. The extendable saw 100 can include a main body 102 and a blade housing 110 which can be coupled together by at least one extendable member 120. The blade housing 110 can at least partially cover a saw blade 130 and the extendable member 120 can be configured to move the blade housing 110 and the saw blade 130 to, from, and/or between a retracted position and an extended position relative to the main body 102. A motorized unit 140 can be coupled to the saw blade 130 and configured to rotate, drive, or otherwise provide other blade movement to the saw blade 130.

The main body 102 can include at least one magnet 150 having at least one contact surface 152. In an embodiment where magnet 150 is a switchable permanent magnet, it can be adjustable or switchable between a magnetized state and a non-magnetized state. In some embodiments, the magnet 150 can be an electromagnet configured to provide a magnetized state and the non-magnetized state from a power source (not shown). For example, the magnet 150 can be an electromagnet in electrical communication with the power source via an electrical control switch, such as a switch 156. The switch 156 can be configured to control the magnetized state and the non-magnetized state of the contact surface 152 by providing an electrical contact in the circuit or by breaking the electrical contact in the circuit. In other embodiments, the magnet 150 can include one or more switchable permanent magnets configured to provide the magnetized state and the non-magnetized state of the contact surface 152. Depending on the type of magnets utilized in the magnet 150, a magnet housing 154 can include various magnets (e.g., switchable permanent magnet, non-switchable permanent magnet, electro-magnet, and/or hybrid electro-permanent magnet(s)) and/or be a structural portion of the magnet 150. For example, the magnet 150 can include one or more electromagnets at least partially within the magnet housing 154 and the contact surface 152 of the electromagnet can be a lower surface of the magnet housing 154. In another example, the magnet housing 154 can be the outer surface of or other portion of one or more electromagnets that can form the magnet 150 and the outer surface of the magnet housing 154 can be the contact surface 152.

In some embodiments, control system means 158 and/or the switch 156 can be operatively coupled to at least the motorized unit 140, the magnet (electromagnet or switchable permanent magnet) 150, and/or the extendable member 120. In one example, the control system means 158 can be configured to activate the magnetized state of the contact surface 152 (or contact surface 252 in FIG. 4B) prior to activating the rotation or other movement of the saw blade 130 via the motorized unit 140 and/or extending or otherwise moving the blade housing 110 and the saw blade 130 via the extendable member 120 to the extended position. In other embodiments, the control system means 158 can be configured to cease the rotation or other blade movement of the saw blade 130 via the motorized unit 140 and/or retract or otherwise move the blade housing 110 and the saw blade 130 via the extendable member 120 to the retracted position prior to deactivating the magnetized state (or activating the non-magnetized state) of the contact surface 152. In other embodiments, the control system means 158 can be configured to cease the rotation or other blade movement of the saw blade 130 via the motorized unit 140 if the magnetized state of the contact surface 152 changes to the non-magnetized state.

The control system means 158, which can have a programmed feed system, can include one or more microprocessors, one or more controllers, one or more switches, software, and/or other equipment that can control one or more of the various aspects and systems of the extendable saw 100, including, but not limited to, the activation and subsequent control of the magnetized state and the non-magnetized state of the contact surface 152 or 252, movement of the extendable member 120 (e.g., actuator) to in turn move the blade housing 110 and saw blade 130 between a retracted position and an extended position relative to the main body 102, the powering and the rotational speed or other blade movement speed of the saw blade 130, movement of the blade housing 110 and the saw blade 130 between a retracted position and an extended position relative to the main body 102, the motorized unit 140 to rotate, drive, or otherwise provide blade movement to the saw blade 130. In one example, a single engagement of the switch 156 can activate the control system means 158 to activate and maintain the magnetized state of the contact surface 152, power-up and rotate or otherwise provide blade movement to the saw blade 130, and extend the blade housing 110 and the saw blade 130 to the desired object to be cut. In another example, a single engagement of the switch 156 can activate the control system means 158 to retract the blade housing 110 and the saw blade 130 to the retracted position and power down the saw blade 130. In another example, one or more engagements of the switch 156 can activate the control system means 158 to power-up and rotate or otherwise provide blade movement to the saw blade 130, extend the blade housing 110 and the saw blade 130 to the desired object to be cut, cut the object, retract the blade housing 110 and the saw blade 130 to the retracted position, and power-down the saw blade 130.

In another example, the control system means may comprise an operator manually performing the one or more of the tasks described above.

In some embodiments, the programmed feed system in the control system means can be used to ensure that the magnetized state of the contact surface 152 or 252 must be on and/or the contact surface 152 or 252 is secured to the work surface prior to and during the use of operating the saw blade 130.

In other embodiments, the extendable member 120 can be configured to move the blade housing 110 and the saw blade 130 in a linear direction or a non-linear (e.g., curved or angular) direction to, from, and/or between the retracted and extended positions. In one embodiment, the extendable member 120 can include an actuator unit 122 coupled to and configured to be driven by a motor 124. As depicted in FIGS. 1A-1C, the actuator unit 122 can include a non-linear actuator and the motor 124 can include an electric motor. However, other types of actuators, actuating devices, motors, and/or devices can be used within the extendable member 120. The motor 124 can include an electric motor (e.g., direct current or alternating current), a hydraulic motor, a pneumatic motor (e.g., gas or air), and/or other similar device.

In another embodiment, a hinge impingement 128 can be coupled to the main body 102 and the blade housing 110. The hinge impingement 128 can be utilized to assist moving or pivoting the blade housing 110 and the saw blade 130 in non-linear or curved directions. For example, the hinge impingement 128 and the actuator unit 122 can be configured to pivot the blade housing 110 and the saw blade 130 forward and in a non-linear direction (e.g., a curved direction or an angular direction) to, from, and/or between the retracted and extended positions. Also, the hinge impingement 128 can be utilized to stabilize or support the blade housing 110 against rotational kick-back while in a cutting operation.

In another embodiment, the blade housing 110 can include one or more upper faces or upper portions 112 and one or more side walls or side portions 114. The upper portion can be disposed about or above the saw blade 130 and the side portion 114 can be at least partially circumferentially disposed around the saw blade 130 and can be extending downwardly from the upper portion 112. An opening or a cutting window 118 can be disposed within or otherwise defined by the upper portion 112 and the side portion 114 of the blade housing 110. The cutting window 118 can provide the saw blade 130 exposure or access to objects that are to be cut by the extendable saw 100 during the cutting operations. The blade housing 110 can be made from or contain one or more non-magnetic materials, such as, for example, aluminum, an aluminum alloy, magnesium, non-magnetic stainless steel, or alloys thereof.

In another embodiment, the extendable saw 100 can include a blade guard 180 coupled to the main body 102 and disposed between the saw blade 130 and the upper portion 112 of the blade housing 110. The blade guard 180 can include at least one support member 182, but generally, can include two or more support members 182 coupled to the main body 102. As depicted in FIG. 1B, each of the support members 182 can pass through the blade housing 110, such as the side portion 114, and attach to a mount 184 disposed on the main body 102. Therefore, the blade guard 180 can be stationary relative to the main body 102 when the blade housing 110 and the saw blade 130 are moved between the retracted and extended positions.

Figure 2A:
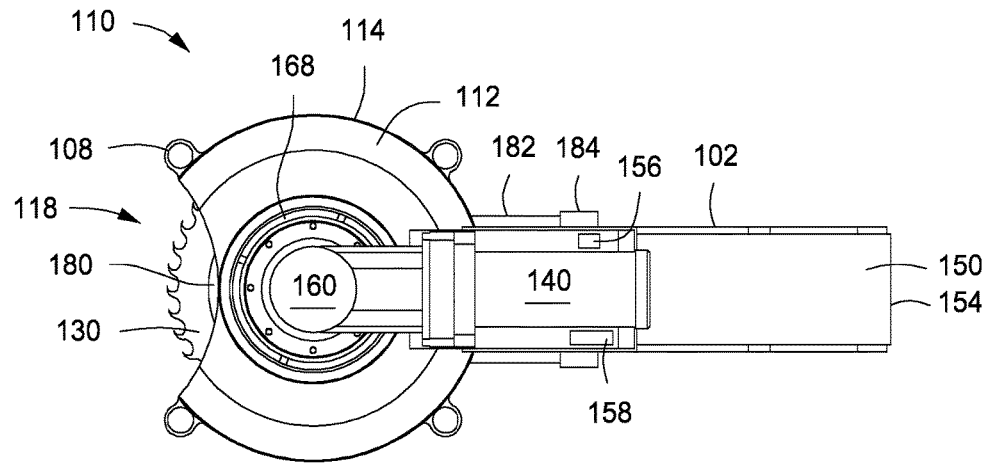
FIGS. 2A-2B depict other perspective views of portions of the illustrative magnetically attachable and extendable saw depicted in FIGS. 1A-1C, according to one or more embodiments described.
Figure 2B:
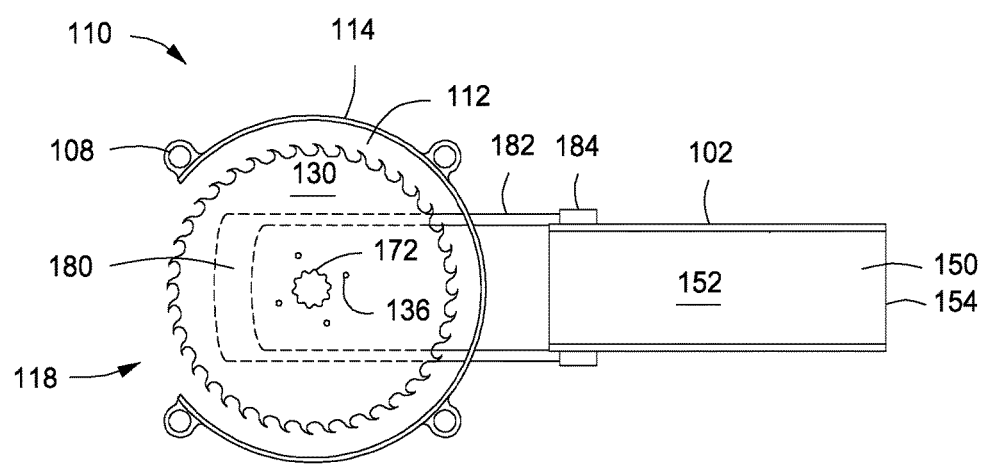

FIGS. 1A-1C depict the blade housing 110 and the saw blade 130 in the retracted position, while FIGS. 2A-2B depict the blade housing 110 and the saw blade 130 in the extended position. The main body 102, the blade housing 110, the saw blade 130, and the blade guard 180 are depicted by an above perspective view illustrated in FIG. 2A and a below perspective view illustrated in FIG. 2B. The blade guard 180 can be configured to at least partially, substantially, or completely conceal or cover the saw blade 130 within the cutting window 118 of the blade housing 110, such as when the blade housing 110 and the saw blade 130 are at the retracted position, as depicted in FIGS. 1A-1C. Also, the blade guard 180 can be configured to at least partially, substantially, or completely reveal or expose the saw blade 130 within the cutting window 118 once the blade housing 110 and the saw blade 130 are at or near the extended position, as depicted in FIGS. 2A-2B.

The extendable member 120 can be configured to move the saw blade 130 by a predetermined maximum cut distance, also known as a stroke. The stroke can be the distance measured from the retracted position to the extended position. The best (but by no means the only) mode will vary with the diameter of saw blade 130. For a saw blade 130 of 10" in diameter, the stroke may be about 75 millimeters. Stroke may range for saw blades of varying diameters from about 12.7 millimeters to about 254 millimeters. In describing stroke approximate ranges herein, nothing shall be construed to limit the invention depicted. Any such limitations must necessarily be found only in the claims that follow.

In another embodiment, the extendable saw 100 can include the motorized unit 140 coupled to or disposed on the blade housing 110. The motorized unit 140 can include an electric motor (e.g., direct current or alternating current), a hydraulic motor, a pneumatic motor (e.g., gas or air), a fuel-powered motor/engine (e.g., gasoline, diesel, or propane), and/or other similar device.

In an example, a saw blade 130 of 10" in diameter may be configured to have a rotational speed or other blade movement speed of about 46 revolutions per minute (RPMs). In other examples, the saw blade 130 can be configured to have a rotational speed or other blade movement speed of from about 10 rpm to 600 RPMs. In describing blade approximate rotation speeds herein, nothing shall be construed to limit the invention depicted. Any such limitations must necessarily be found only in the claims that follow.

In an example, a motorized unit 140 configured with a saw blade 130 of 10" in diameter may have a rotational speed of about 3,000 RPMs. In other examples, the motorized unit 140 can be configured to have a rotational speed of about 20-5,000 RPMs. The motorized unit can be coupled to a gear reducer or a gear reduction unit. In describing the motorized unit approximate RPMs herein, nothing shall be construed to limit the invention depicted. Any such limitations must necessarily be found only in the claims that follow.

In some examples, the motorized unit 140 can be an electric motor, such as a direct current, brush-type motor, and the saw blade 130 can be rotated, driven, or otherwise moved by the electric motor. The motorized unit 140 generally can be directly or indirectly coupled to the saw blade 130 by at least one or more components, such as, for example, shafts, arbors, gears (e.g., gear reducers), transmission, clutch, belts, a base plate, or any combination thereof.

In one or more embodiments, the motorized unit 140 can be directly or indirectly coupled to a gear unit 160 and the saw blade 130 can be directly or indirectly coupled to the gear unit 160. In some exemplary configurations, the gear unit 160 can be directly or indirectly coupled to a base plate 170 (FIG. 3) and the saw blade 130 can be directly or indirectly coupled to the base plate 170. In other exemplary configurations, the gear unit 160 can be directly or indirectly coupled to a shaft or arbor (not shown) and the saw blade 130 can be directly or indirectly coupled to the shaft or arbor. In other exemplary configurations, the gear unit 160 can be directly or indirectly coupled to the base plate 170 and/or the shaft or arbor and the saw blade 130 can be directly or indirectly coupled to the base plate 170 and/or the shaft or arbor.

The gear unit 160 can include one or more gears (e.g., a plurality of varying sized gears), shafts and/or arbors, a transmission, a clutch (e.g., spring loaded clutch), belts, bearings, or any combination thereof. For example, the gear unit 160 can be a gear reducer configured to provide a rotational speed or other blade movement speed of the saw blade 130 at a reduced rate relative to the rotational speed of the motorized unit 140 by a predetermined ratio referred to as the motor:saw blade rotational speed ratio. In an example, the motor:saw blade rotational speed ratio may be about 65:1. In other examples, the motor:saw blade rotational speed ratio may vary from about 25:1 to about 500:1 or even greater. In describing said motor:saw blade rotational speed ratios nothing shall be construed to limit the invention depicted. Any such limitations must necessarily be found only in the claims that follow.

Coolant/lubricant can be applied to the blade or cut area by applicator means to reduce heat, improve cut quality, prolong life of the blade, and reduce torque required to cut. The coolant/lubricant can be applied to the blade just prior to the cut area, or directly on the cut area. Typically the coolant/lubricant would be carried to the blade via applicator means at or near the cut area. The applicator would depend on whether it was a solid or a liquid. The coolant/lubricant could include without limitation water, oil, grease, synthetic, or wax based substance, air, or a combination thereof. In some embodiments, the extendable saw 100 can be equipped with an electric motor as the motorized unit 140 and a gear reduction unit as the gear unit 160 that can reduce the rotational speed or other blade movement speed of the saw blade 130 while maintaining constant torque or substantially constant torque to the saw blade 130. In other embodiments, the extendable saw 200 (FIGS. 4A and 4B) can have a clutch (not shown) for providing slippage to the saw blade 130 (FIG. 4B) while in operation. In one example, the extendable saw 200 can have a clutch (not shown) in the driving mechanism, such as the motorized unit 140, the gear unit 160, or any combination thereof.

Figure 3:
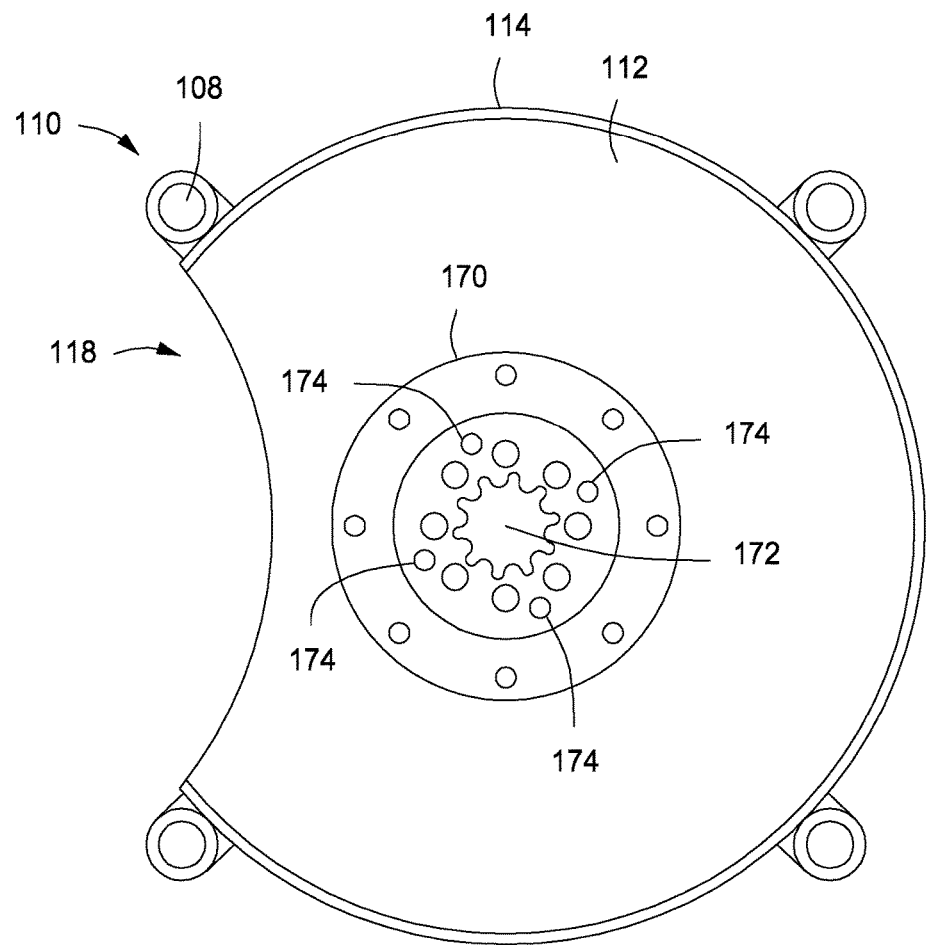
FIG. 3 depicts another perspective view of a portion of the illustrative magnetically attachable and extendable saw depicted in FIGS. 1A-2B, according to one or more embodiments described.

In some embodiments, the saw blade 130 can be coupled to the base plate 170, a shaft or arbor (not shown), or a combination of the base plate 170 and the shaft or arbor by one or more fasteners 136, one or more keepers 172, one or more spindles (not shown), or any combination thereof, as depicted in the drawings including in FIGS. 1B, 2B, and 3. In one embodiment, the fasteners 136 and/or the keepers 172 can be flush with or recessed from (e.g., countersunk) the lower surface or plane of the saw blade 130, as depicted in FIG. 1B. In another embodiment, the fasteners 136 and/or the keepers 172 can be flush with or protrude from the lower surface or plane of the saw blade 130

Exemplary fasteners 136 can include, but not limited to, one or more bolts and screws (e.g., hex-heads), rivets, pins, spindles, or any combination thereof. Exemplary keepers 172 can include, but not limited to, spline sets and other male/female keeper sets for withstanding the torque generated by the saw blade 130, as well as one or more spindles. The one or more keepers 172 can be disposed on the base plate 170 and/or a shaft or arbor (not shown).

FIG. 3 depicts the base plate 170 containing a male portion of a spline set as the keeper 172 and a plurality of threaded holes 174 for receiving the fasteners 136. The saw blade 130, as depicted in FIGS. 1B and 2B, can include an orifice 132 or a female portion of the spline set for receiving the keeper 172 and a plurality of holes 134 in the saw blade 130 for receiving the fasteners 136. For example, the fasteners 136 can be configured to pass through the plurality of holes 134 in the saw blade 130 and thread-in, anchor to, or otherwise attach to the plurality of threaded holes 174 within the base plate 170 and/or a shaft or arbor (not shown). During a cutting process, the torque or load from the saw blade 130 can be placed on the base plate 170 and/or the shaft or arbor. Therefore, the saw blade 130 can be placed on the base plate 170 and/or the shaft or arbor without, or substantially without, slack, play, looseness, or movement.

The saw blade 130 can include one or more orifices 132 or female portions of the spline set for receiving the one or more orifice keepers 172. The keepers 172 and the orifices 132 can have one or more different patterns, shapes, or geometries, such that each male/female keeper set respectively forms a locking set with a matching pattern and the saw blade 130 is secured to, attached to, or otherwise coupled to the base plate 170 and/or a shaft or arbor (not shown). Each of the keepers 172 and the orifices 132 can have one or more different shapes or geometries, such as stars, flowers, ellipses, triangular, rectangular, squares, pentagonal, hexagonal, heptagonal, octagonal, nonagonal, decagonal, or other polygonal shapes.

In some embodiments, the base plate 170 can be directly or indirectly coupled to a shaft or arbor (not shown) which is configured to drive the base plate 170 and hence drive the saw blade 130. In other embodiments, the base plate 170 can be one end of the shaft or arbor, such that the keeper 172 can be a protruding portion of the end of the shaft or arbor and/or the plurality of threaded holes 174 can be formed within the end of the shaft or arbor.

In another embodiment, the extendable saw 100 can also include a blade offset ring or a blade height adjuster 168 coupled to the blade housing 110 and the base plate 170. The blade height adjuster 168 can be configured to adjust, such as to increase and/or decrease, a vertical blade height of the saw blade 130. The vertical blade heights can be measured as a minimum height and a maximum height for operating the saw blade 130. The minimum and maximum heights are exemplary heights and should not be construed to be limiting in a particular range or value. For example, the vertical blade height can be measured perpendicular from the work surface as a minimum height, such as when the lower surface of the saw blade 130 skims the work surface, to a maximum height range of from about 1 millimeter to 2.55 millimeters. Such range may vary, for example from about 0.01 millimeters to about 25 millimeters. In describing the height ranges herein, nothing shall be construed to limit the invention depicted. Any such limitations must necessarily be found only in the claims that follow.

In one embodiment, the blade height adjuster 168 can include a screw mechanism for adjusting the vertical blade height. For example, the blade height adjuster 168 can include a castle nut or a spinner nut and the respective wrench can be used to increase or decrease the vertical blade height of the saw blade 130 by adjusting the relative position of the base plate 170 to the blade housing 110.

A kerf width or a saw cut width (e.g., the width of the cut) can generally depend on several factors including the width and thickness of a saw blade, the set and number of teeth on the saw blade, and the amount of slack or play available during cutting with the saw blade, as well as other factors. In one or more embodiments, the kerf width of the saw blade 130 can generally be proportional to the thickness of the saw blade 130. In some embodiments, the saw blade 130 can have a kerf width of about, by example and not limitation, 5 millimeters.

A set is generally the degree to which the teeth are bent or otherwise disposed outwardly from the plane of the blade in one or both directions. In one or more embodiments, the saw blade 130 can have a set so that every other tooth of the blade teeth is sequentially angled upward or downward relative to the plane of the saw blade 130. In other embodiments, the saw blade 130 can have a set so that every two teeth of the blade teeth are sequentially angled upward or downward relative to the plane of the saw blade 130. The set can provide the cut thickness of the saw blade 130 wider than the base thickness of the saw blade 130 itself. This additional cut thickness can provide clearance space between the base plate 170 and/or the shaft or arbor and the work surface (e.g., the base material being cut) so that the base plate 170 and/or the shaft or arbor can be kept from dragging or contacting work surface. The additional cut thickness can be provided because of the downwardly angled bent teeth of the saw blade 130 skimming the work surface during operation.

In other embodiments, the blade housing 110 can include at least one roller 108 or two or more rollers 108 disposed on the blade housing 110. In some embodiments, four rollers 108 are disposed on the blade housing 110, as depicted in FIG. 1B. The rollers 108 can be positioned on the blade housing 110 to extend below the side portion 114. The rollers 108 are configured to roll or otherwise move the blade housing 110 to, from, and/or between the retracted and extended positions. In some examples, the rollers 108 can be round rollers and configured to elevate the blade housing 110 off from a work surface. The blade housing 110 can be elevated off of a work surface by a distance small enough so as to contain the blade within the housing should it become detached.

In exemplary embodiments, the saw blade 130 can be a circular, cold saw blade or chop saw blade, as depicted in FIGS. 1B and 2A-2B. However, other types and geometries of the saw blade 130 can be utilized in embodiments, including blades from circular saws, cold saws, cut-off saws, chop saws, rip saws, hacksaws, hot saws, friction saws, band saws, scroll saws, jig saws, as well as other saws. In some embodiments, the saw blade 130 can include or be coated with tungsten, tungsten carbide, hardened steel, hardened tool steel, high speed steel, alloys thereof, or combinations thereof. In some examples, the saw blade 130 can be a hardened-tool steel circular saw blade, a high speed steel circular saw blade, or a tungsten carbide-tipped, circular saw blade.

In some examples, the saw blade 130 can have a thickness of about 1.5-2.5 millimeters. The saw blade thickness may vary from about 0.5 mm to about 6.5 millimeters. In describing saw blade thicknesses nothing shall be construed to limit the invention depicted. Any such limitations must necessarily be found only in the claims that follow In other embodiments, since each of the motor 124 and/or the motorized unit 140 can include an electric motor (e.g., direct current or alternating current), a hydraulic motor, a pneumatic motor (e.g., gas or air), a fuel-powered motor/engine (e.g., gasoline, diesel, or propane), or other similar device, then the extendable saw 100 can be powered by electricity, compressed fluids, or compressed gases. In some embodiments, the extendable saw 100 can be powered by electricity, such as direct current or alternating current. The extendable saw 100 can include a power source, such as a power pack, a battery, or a power cell and/or contain a power plug (not shown). Alternatively, in other embodiments, the extendable saw 100 can include hydraulic or pneumatic inlets (not shown) for powering the motor 124 and/or the motorized unit 140.

In one or more embodiments, once the switch 156 is activated, the motorized unit 140 can rotate the saw blade 130 with or without a preprogramed time delay, the extendable member 120 (e.g., actuator) can drive the blade housing 110 and the saw blade 130 to the extended position (e.g., cut length), then can drive the blade housing 110 and the saw blade 130 to the retracted position, and then can cease operation (e.g., stop rotation) of the saw blade 130. In some examples, the feed rate of the saw blade 130 can be programmed not to overload or over-torque the saw blade 130.

Figure 4A:
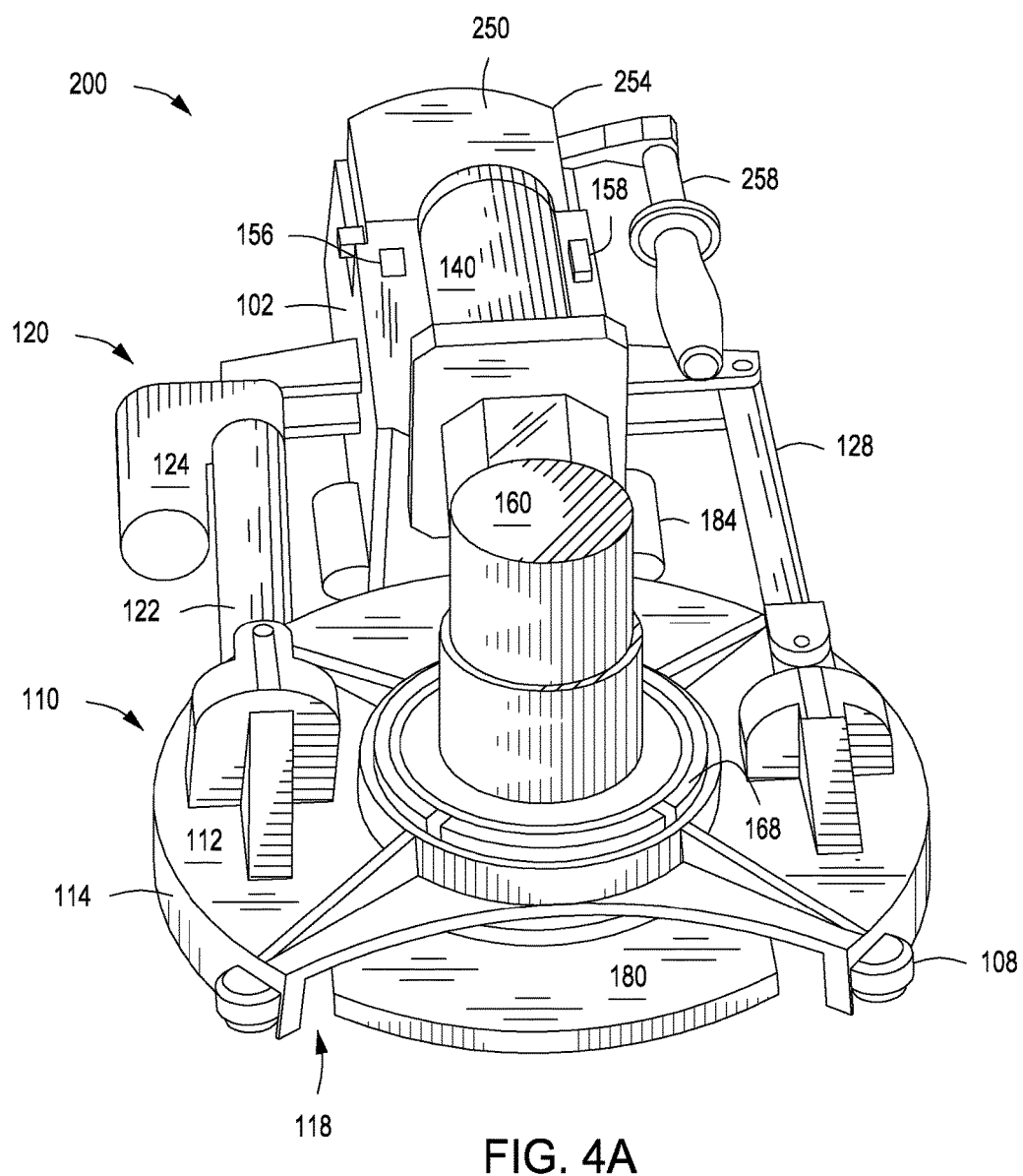
FIGS. 4A-4B depict perspective views of another illustrative magnetically attachable and extendable saw, according to one or more embodiments described.
Figure 4B:
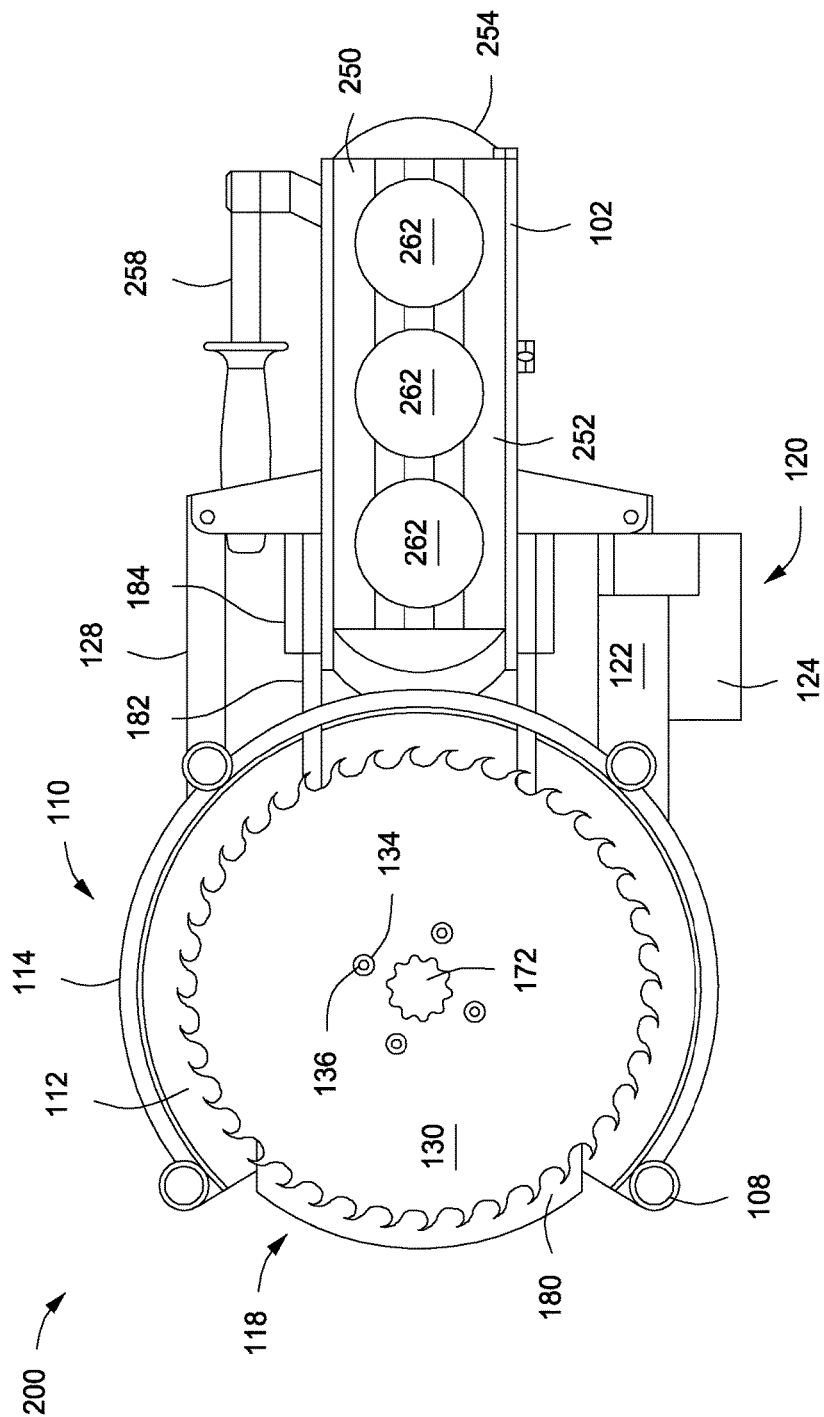

FIGS. 4A-4B depict perspective views of an illustrative magnetically attachable and extendable saw 200, according to one or more embodiments. In one embodiment, the extendable saw 200 can include the main body 102, the blade housing 110, and the extendable member 120 as described for the extendable saw 100. The extendable saw 200 or portions thereof depicted in FIGS. 4A-4B and the extendable saw 100 or portions thereof depicted FIGS. 1A-3 share many common components. It should be noted that like numerals shown in the Figures and discussed herein represent like components throughout the multiple embodiments disclosed herein.

In one or more embodiments, the attachable and extendable saw 200 can include the blade housing 110 coupled to the main body 102 by at least one extendable member 120. The blade housing 110 can at least partially cover the saw blade 130 and the extendable member 120 can be configured to move the blade housing 110 and the saw blade 130 to/from, and/or between a retracted position and an extended position relative to the main body 102. The motorized unit 140 can be coupled to the saw blade 130 and configured to rotate, drive, or otherwise provide other blade movement to the saw blade 130. In one or more embodiments, the main body 102 can include a switchable magnet 250 or an electromagnet 250 disposed on the main body 102 having at least one contact surface 252 that can be adjustable or switchable between a magnetized state ("on") and a non-magnetized state ("off"). The switchable magnet 250 can also include a magnet housing 254, one or more magnets 262 disposed within the magnet housing 254, a switch, a handle, a knob, or a lever (hereinafter "lever") 258 extending from the magnet housing 254 configured to control the magnetized state and the non-magnetized state of the contact surface 252, and at least one contact surface 252 that can be adjustable or switchable between a magnetized state and a non-magnetized state. The magnets 262 can be configured to provide a magnetized state and non-magnetized state of the contact surface 252. The lever 258 can be configured to cause relative rotation of the magnets 262 for controlling the magnetized state and the non-magnetized state of the contact surface 252. For example, the lever 258 can be pulled, pushed, switched, turned, rotated, twisted, and/or slid, in one or more directions to cause relative rotation of the magnets 262 for controlling the magnetized state and the non-magnetized state of the contact surface 252. FIG. 4A-4B depict the lever 258 extending from one side of the switchable magnet 250, but the lever 258 can be configured to extend from any of sides or surfaces of the switchable magnet 250, the magnet housing 254, and/or the main body 102. In some examples, the lever 258 can be a handle or a knob extending from the upper surface of the magnet housing 254 (not shown).

For the extendable saw 200, the control system means 158 can include one or more microprocessors, one or more controllers, one or more switches, software, and/or other equipment that can control one or more of the various aspects and systems of the extendable saw 200, including, but not limited to, the activation and subsequent control of the magnetized state and the non-magnetized state of the contact surface 252, movement of the extendable member 120 (e.g., actuator) to in turn move the blade housing 110 and saw blade 130, or saw blade 130 alone, between a retracted position and an extended position relative to the main body 102, the powering and the rotational speed or other blade movement speed of the saw blade 130, movement of the blade housing 110 and the saw blade 130, or saw blade 130 alone, between a retracted position and an extended position relative to the main body 102, the motorized unit 140 to rotate, drive, or otherwise provide blade movement to the saw blade 130. In one example, a single engagement of the switch 156 can activate the control system means 158 to activate and maintain the magnetized state of the contact surface 152, power-up and rotate or otherwise provide blade movement to the saw blade 130, and can also extend the blade housing 110 and the saw blade 130, or saw blade 130 alone, to the desired object to be cut. In another example, a single engagement of the switch 156 can activate the control system means 158 to retract the blade housing 110 and the saw blade 130, or the saw blade 130 alone, to the retracted position and power-down the saw blade 130. In another example, a single engagement of the switch 156 can activate the control system means 158 to power-up and rotate or otherwise provide blade movement to the saw blade 130, extend the blade housing 110 and the saw blade 130, or saw blade 130 alone, to the desired object to be cut, cut the object, retract the blade housing 110 and the saw blade 130, or saw blade 130 alone, to the retracted position, and power-down the saw blade 130.

In some exemplary embodiments, the magnetized state of the contact surface 252 can be activated via the lever 258 prior to engaging the switch 156 to activate the control system means 158. In some embodiments, switches (e.g., kill switches or safety switches), sensors, locking mechanisms, and/or other electronic or mechanical devices (not shown) may be operatively coupled to the lever 258, the switch 156, the control system means 158, the motorized unit 140, and/or other components of the extendable saw 200. Such switches sensors, locking mechanisms, and/or other electronic or mechanical devices (not shown) may be configured to provide blade movement of the saw blade 130 once the magnetized state has been engaged and the contact surface 252 has been magnetically attached to the work surface and/or to cease blade movement of the saw blade 130 once the non-magnetized state has been engaged and the contact surface 252 has been detached from the work surface.

In some examples, the switch 156, the control system means 158, and/or other components of the extendable saw 200 can be or include one or more kill switches, such as, for example, a torque kill switch. The kill switches (for example, switch 156) can be operatively coupled to and in electrical communication with the motorized unit 140 and can be configured to cease blade movement of the saw blade 130. The one or more kill switches can be configured to disengage or break electrical communication between one or more power sources and the motorized unit 140 and/or the control system means 158 upon sensing or registering a predetermined event occurrence, such as, for example, a maximum value of torque directly or indirectly exposed to or experienced by the saw blade 130, the gear unit 160, and/or the motorized unit 140. In other examples, the predetermined event occurrence for triggering the kill switch can be a partial, substantial, or complete loss of the magnetized state and/or a partial, substantial, or complete disengagement of the contact surface 252 from the work surface.

In one or more embodiments, the magnet housing 254 can be or include one or more materials having a low magnetic reluctance and/or a high magnetic reluctance. The low magnetic reluctance materials can be ferrimagnetic or ferromagnetic ("magnetically susceptible material"). The high magnetic reluctance materials can include, for example aluminum, magnesium, and/or carbon fiber. In one or more embodiments, within the magnet housing 254 a first magnet or "lower magnet" can be held in a fixed position beneath a second magnet or "upper magnet" that can be rotated about its axis. In one or more embodiments, the lower surface of the lower magnet can form part of the contact surface 252 of the switchable magnet 250. In one or more embodiments, the lower surface of the lower magnet can be recessed within the magnet housing 254, such that the sides of the magnet housing 254 provide a gap between a lower surface of the lower magnet and the contact surface 252 of the switchable magnet 250.

The lever 258 can rotate the second magnet relative to the first magnet within the magnet housing 254. The second magnet can include a notch or groove configured to engage or receive a bar (not shown) in communication with the lever 258. The bar can be received inside a groove formed on a boss (not shown) that can be connected to the lever 258. The lever 258 can have two or more positions, at least one of which can be an "on" position and at least one of which can be an "off" position.

In one or more embodiments, rotating the second magnet 180° about its axis can align the poles of both the first magnet and the second magnet in the "on" position to produce an external magnetic field. When so aligned, the north (positive) and south (negative) poles of the second magnet can substantially overlie the north and south poles of the first magnet, creating a strong external magnetic field about the magnet housing 254. In one or more embodiments, at least a portion of the strong external magnetic field can be directed towards the contact surface 252 of the switchable magnet 250. The extendable saw 200 can magnetically attach the contact surface 252 to a magnetically susceptible surface (not shown) when switched to the "on" position.

In one or more embodiments, the magnet housing 254 can be or include one, two, or more pole pieces that can enhance the magnetic functionality of the switchable magnet 250. The shape or wall thickness of the pole pieces forming the magnet housing 254 can increase or decrease the external magnetic field strength. For example, to provide a higher external magnetic field, the pole pieces can be shaped in such a way that they reflect the variation of the magnetic field strength around the perimeter of the permanently magnetized first and second magnets.

In one or more embodiments, the switchable magnet 250 can include one, two, three, four, five, or more independent switchable permanent magnets. In one or more embodiments, a switchable magnet 250 that includes a plurality of switchable permanent magnets disposed within the magnet housing 254 can be switched between the "on" and "off" positions via lever 258. In one or more embodiments, a switchable magnet 250 that includes a plurality of switchable permanent magnets disposed within the magnet housing 254 can include two or more switches, handles, knobs, or levers 258 that can switch one or more of the switchable magnets between the "on" position and the "off" position.

In one or more embodiments, the magnet housing 254 can provide a waterproof and/or dustproof housing to protect the one or more switchable permanent magnets disposed therein. The switchable magnet 250 can be suitable for use in harsh, dusty, and/or wet environments. Additional details of a suitable switchable magnet 250 is further discussed and described in U.S. Pat. Nos. 6,707,360 and 7,012,495 and U.S. Patent Application No. 2004/0239460, which are incorporated by reference herein to the extent such disclosure is not inconsistent with this application and for all jurisdictions in which such incorporation is permitted.

In another embodiment, the switchable magnet 250 can include one, two, or more pole conduits, core elements, and/or combination carrier platter/core element assemblies (not shown) as one or more of the permanent magnets 262 disposed within the magnet housing 254 and forming the contact surface 252, as depicted in FIG. 4B. The magnet housing 254 and/or the permanent magnets 262 can be or include one, two, or more pole conduits, core elements, and/or combination carrier platter/core element assemblies which can provide the contact surface 252 with a magnetized state ("on") and a non-magnetized state ("off") by the manipulation of the lever 258.

In some examples, the lever 258 can be configured to cause relative rotation of the magnets 262 (and/or any portion of or any one, two, or more pole conduits, core elements, and/or combination carrier platter/core element assemblies) for controlling the magnetized state and the non-magnetized state of the contact surface 252. In other examples, instead of the lever 258, a switch, knob, handle, or lever (not shown) can extend from the upper surface or other surface of the magnet housing 254 or the main body 102. The switch, knob, handle, or lever can be pulled, pushed, switched, turned, rotated, twisted, slid, in one or more directions to cause relative rotation of the permanent magnets 262 (and/or any portion of or any one, two, or more pole conduits, core elements, and/or combination carrier platter/core element assemblies) for controlling the magnetized state and the non-magnetized state of the contact surface 252.

In some embodiments, the contact surface 252 and/or each of the permanent magnets 262 can be or include a switchable core element-based permanent magnet apparatus, which contains two or more carrier platters having core elements. The core elements can be magnetically matched pole conduits attached to the north and south magnetic poles of one or more permanent magnets, inset into carrier platters. The pole conduits can include and redirect the magnetic field of the permanent magnets to the upper and lower faces of the carrier platters. By containing and redirecting the magnetic field within the pole conduits, like poles can have a simultaneous level of attraction and repulsion. Aligning upper core elements "in-phase" (e.g., north-north/south-south) with the lower core elements, can activate the apparatus and can provide the magnetized state ("on") by redirecting the combined magnetic fields of the pole conduits into the target. Anti-aligning upper core elements "out-of-phase" (e.g., north-south/south-north) with the lower core elements, can deactivate the apparatus and can provide the non-magnetized state ("off") resulting in pole conduits containing opposing fields.

In one or more embodiments, the switchable magnet 250 can include one, two, three, or more switchable core element-based permanent magnet apparatuses (not shown). Each switchable core element-based permanent magnet apparatus can include an upper carrier platter aligned above a lower carrier platter by a common axis. The upper carrier platter, the lower carrier platter, or both can be configured to be rotatable about the common axis for activating the magnetized and non-magnetized states of the at least one contact surface 252. The upper carrier platter can include two or more upper core elements having magnetically matched pole conduits and the lower carrier platters can include two or lower more core elements having magnetically matched pole conduits. The magnetically matched pole conduits of the upper core elements and the magnetically matched pole conduits of the lower core elements can be configured to be aligned, adjusted, or otherwise moved in phase to activate the magnetized state of the at least one contact surface 252 and configured to be anti-aligned, adjusted, or otherwise moved out of phase to activate the non-magnetized state of the at least one contact surface 252. Additional details of a suitable switchable magnet 250 are further discussed and described in U.S. Pat. Nos. 8,183,965, 8,256,098, and U.S. Pat. No. 8,350,663 (each by Inventor Jim G. Michael, assigned to Creative Engineering Solutions, Inc.), which are incorporated by reference herein to the extent such disclosure is not inconsistent with this application and for all jurisdictions in which such incorporation is permitted.

FIGS. 5A-5G depict perspective views of an illustrative magnetically attachable and extendable saw 300, according to one or more embodiments. In one embodiment, the extendable saw 300 can include a main body 302 and the blade housing 110 which can be coupled together by one or more extendable members 320. FIGS. 6A-6D depict other perspective views of portions of the extendable saw 300, such as the extendable member 320 disposed between the main body 302 and the blade housing 110, according to one or more embodiments. The extendable saw 300 or portions thereof depicted in FIGS. 5A-6D and the extendable saws 100 and 200 or portions thereof depicted FIGS. 1A-4B share many common components. It should be noted that like numerals shown in the Figures and discussed herein represent like components throughout the multiple embodiments disclosed herein.

The blade housing 110 can at least partially cover the saw blade 130 and the extendable member 320 can be configured to move the blade housing 110 and the saw blade 130 in a linear or a non-linear (e.g., curved or angular) direction to, from, and/or between a retracted position and an extended position relative to the main body 302. FIGS. 5A, 5C, 5E-5G, 6A, and 6C depict the extendable saw 300 with the blade housing 110 and the saw blade 130 in the retracted position, while FIGS. 5B, 5D, 6B, and 6D depict the extendable saw 300 with the blade housing 110 and the saw blade 130 in the extended position. The extendable member 320 disposed between the main body 302 and the blade housing 110 is depicted by above perspective views illustrated in FIGS. 6A and 6C and by below perspective views illustrated in FIGS. 6B and 6D.

Figure 5A:
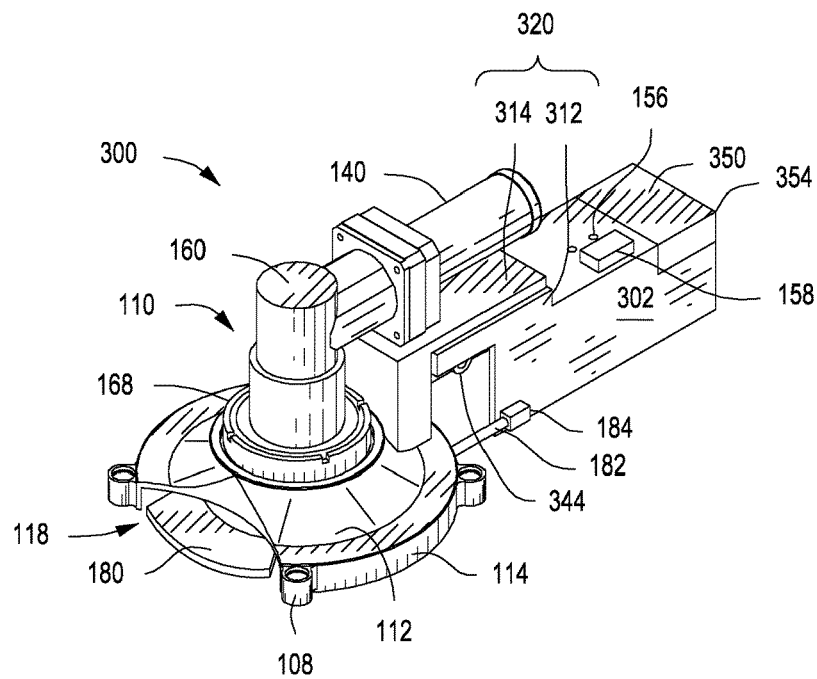
FIGS. 5A-5G depict perspective views of another illustrative magnetically attachable and extendable saw, according to one or more embodiments described.
Figure 5B:
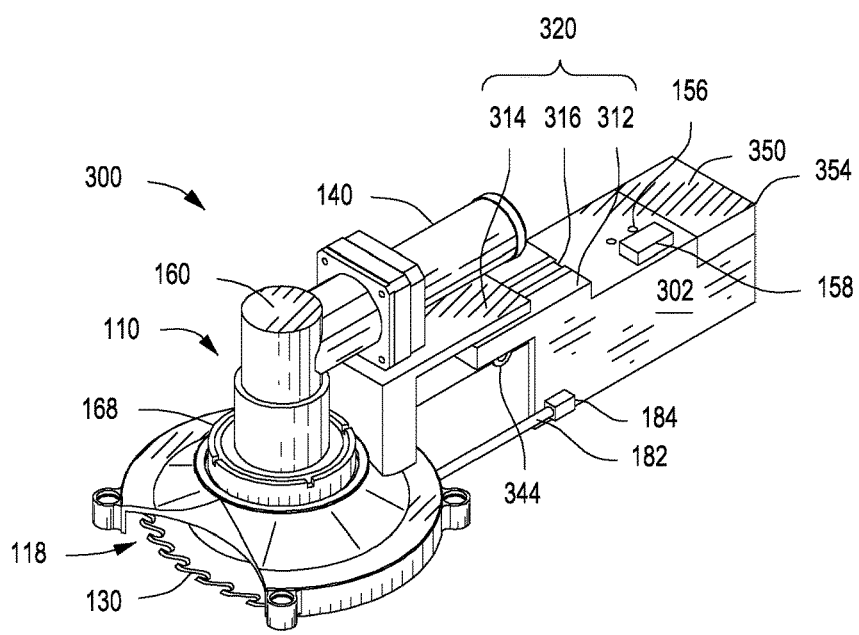
Figure 5C:
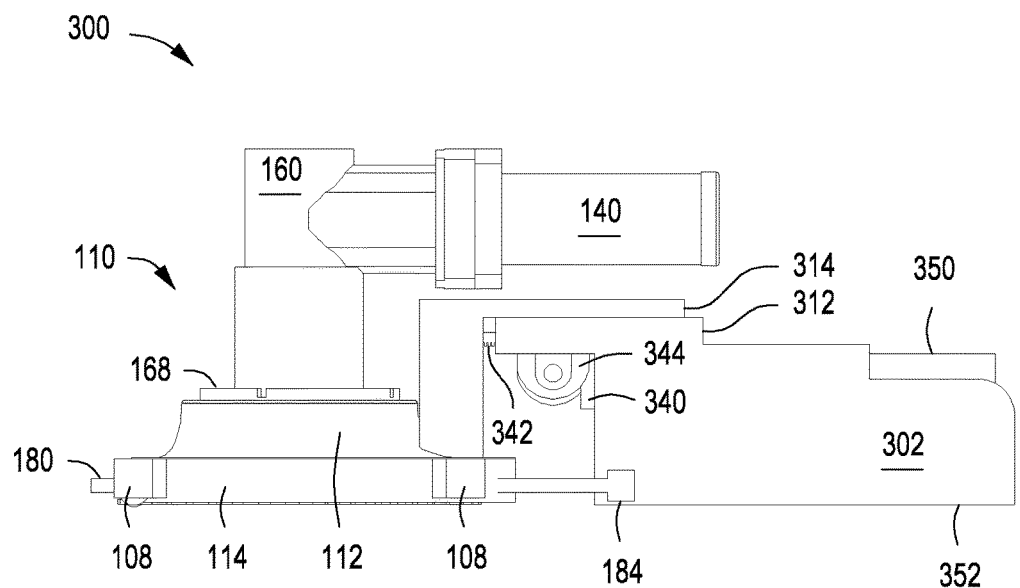
Figure 5D:
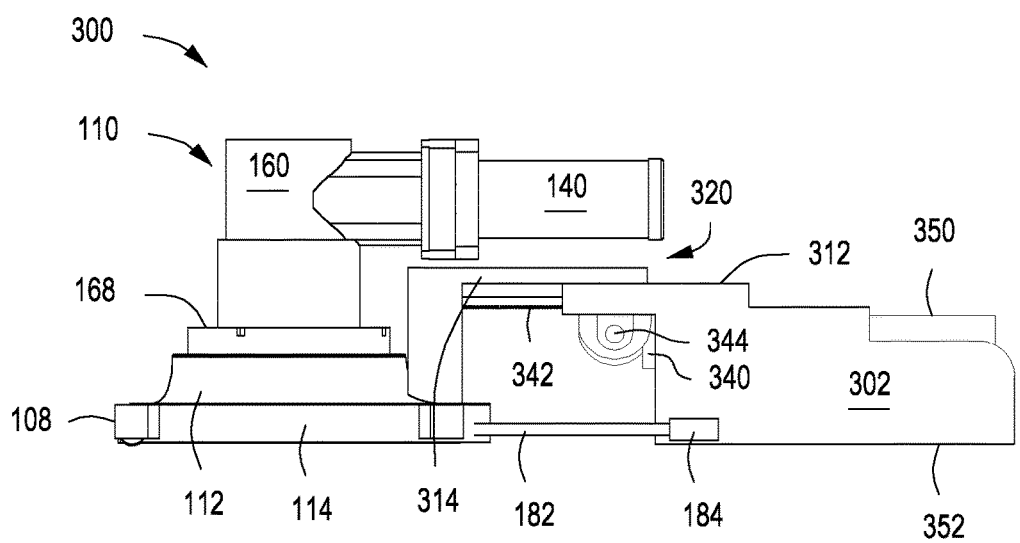

The extendable member 320 can be configured to provide directional guidance to the blade housing 110 and the saw blade 130 in a linear or non-linear (e.g., curved or angular) direction to, from, and/or between the retracted and extended positions. FIG. 5A shows that the extendable member 320 can include a first segment 312 coupled to the main body 302 and a second segment 314 coupled to the blade housing 110, according to one or more embodiments. The first segment 312 and the second segment 314 can be coupled together and configured to slide or otherwise move parallel relative to each other. A guide track 316 disposed in the first segment 312, as depicted in the extended position in FIG. 5B, can be configured to receive a portion of the second segment 314 (not shown) for providing the extendable member 320 with the linear direction to, from, and/or between the retracted and extended positions. In other embodiments, not shown, the guide track 316 can be disposed in the second segment 314 and a portion of the first segment 312 can be configured to be received by the guide track 316 for providing the extendable member 320 with the linear direction.

Figure 5F:
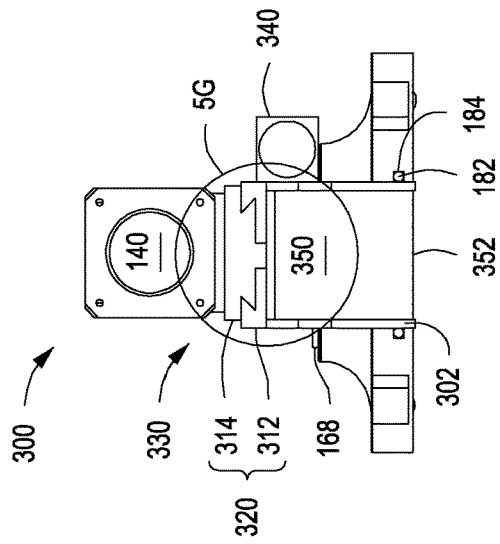
Figure 5E:
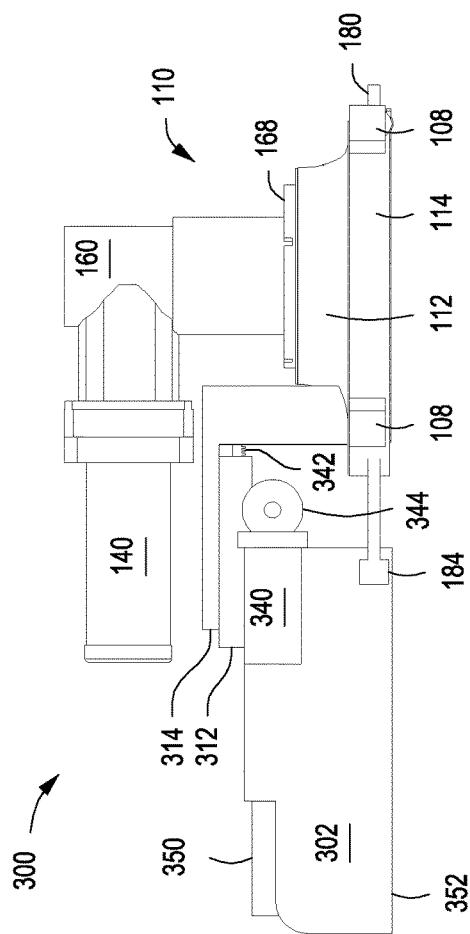
Figure 5G:
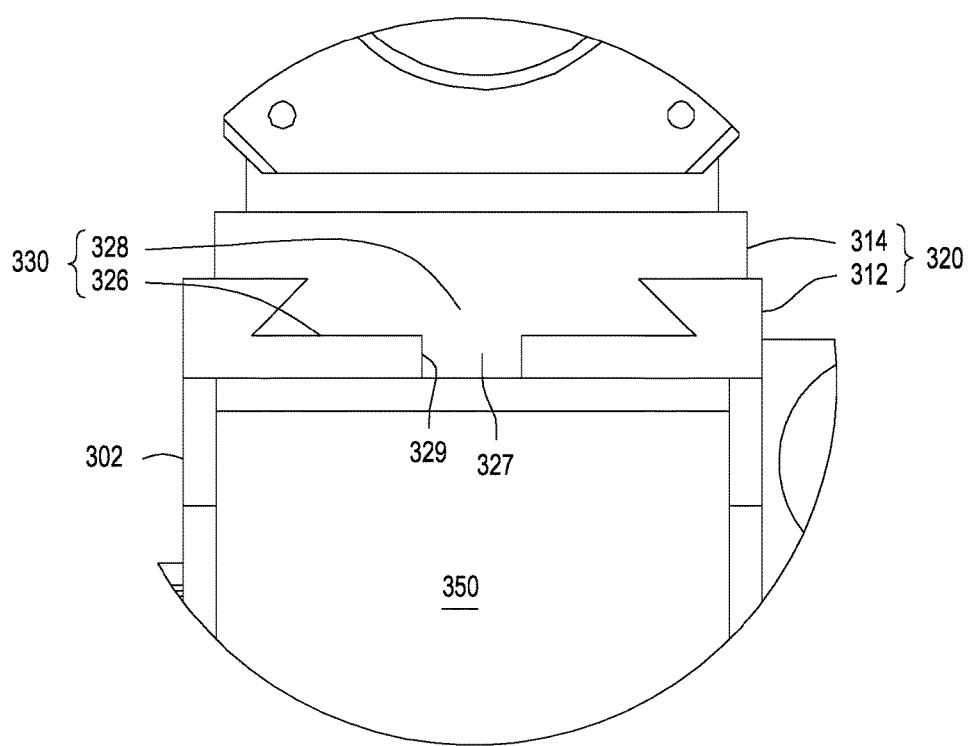
Figure 6A:
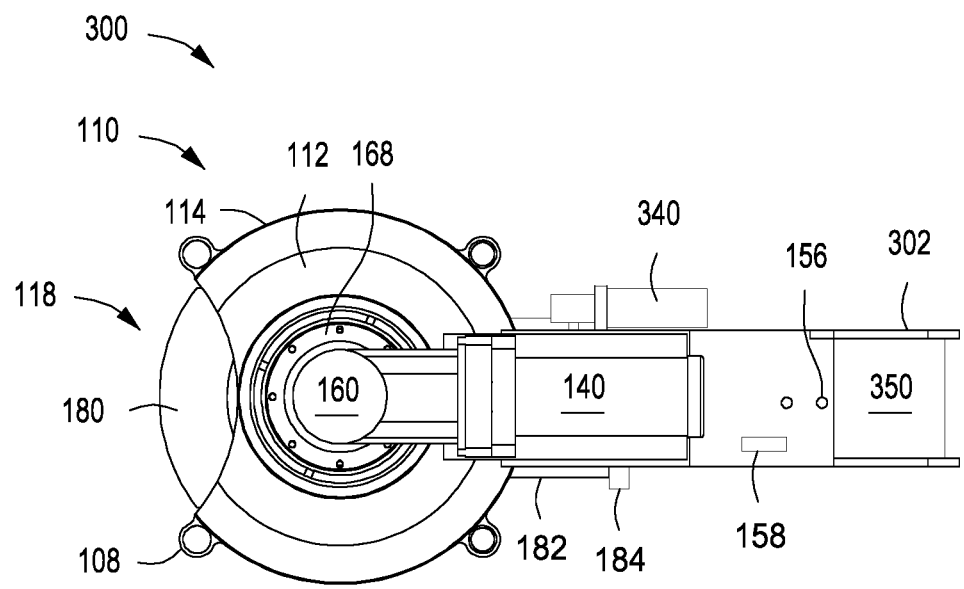
FIGS. 6A-6D depict other perspective views of portions of the illustrative magnetically attachable and extendable saw depicted in FIGS. 5A-5G, according to one or more embodiments described.
Figure 6B:
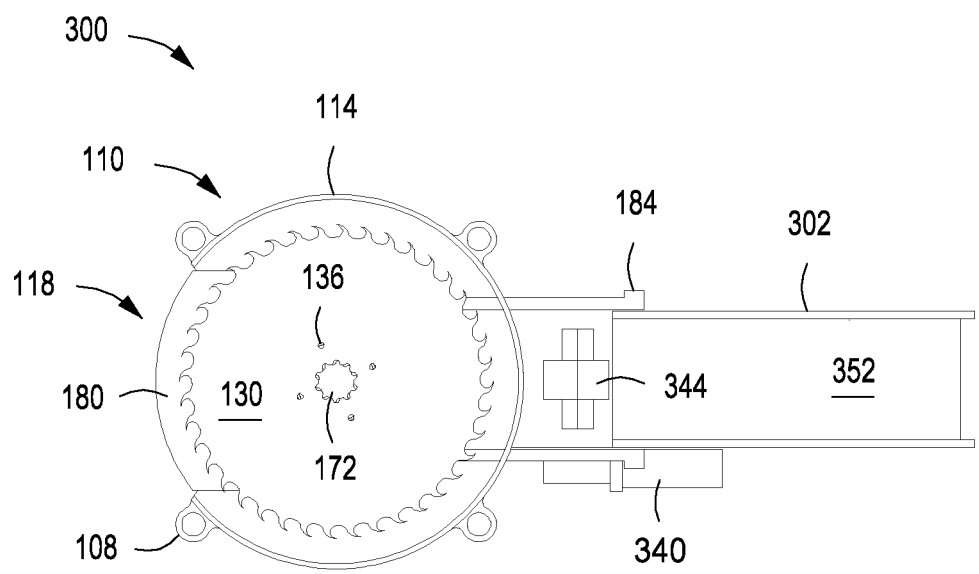
Figure 6C:
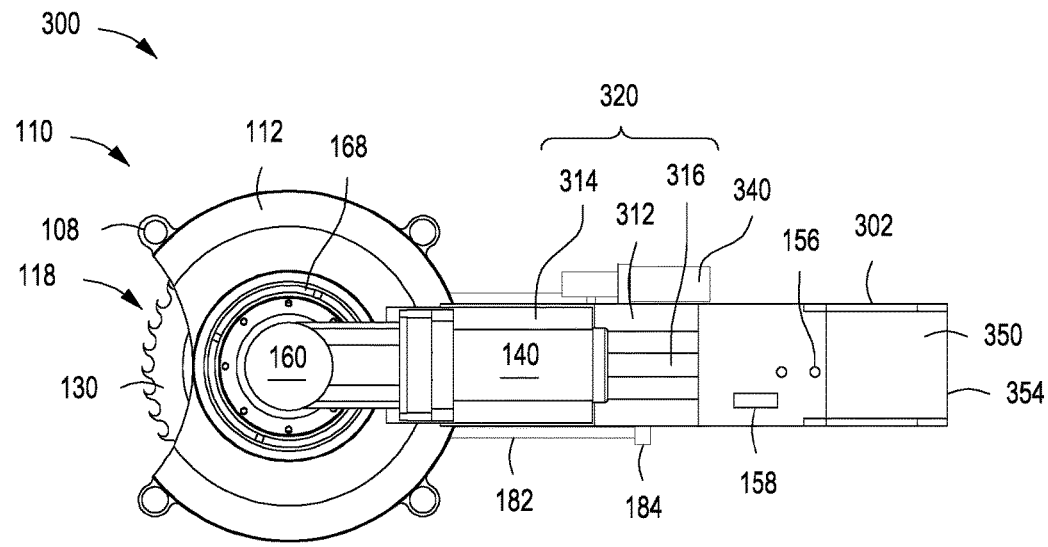
Figure 6D:
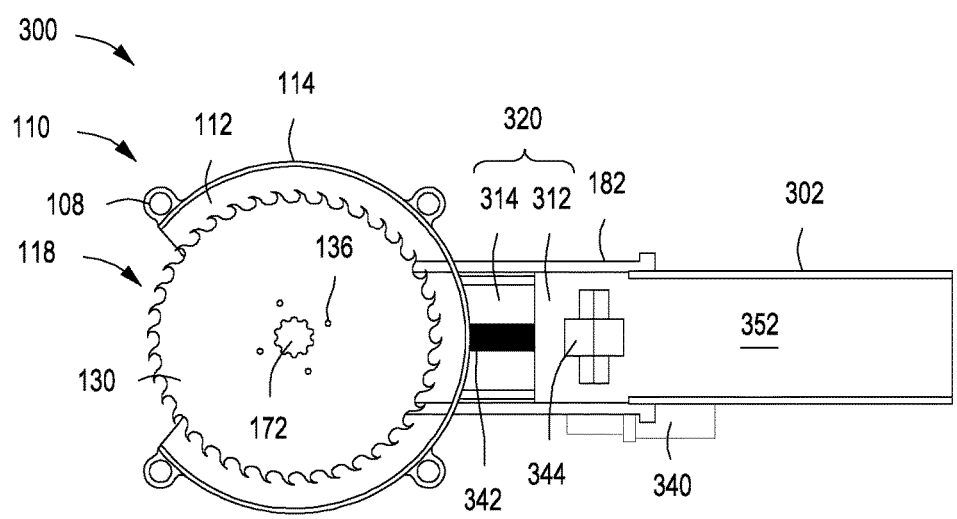

In some embodiments, as depicted in FIGS. 5F and 5G, a sliding male/female joint 330 can be disposed between the first segment 312 and the second segment 314 of the extendable member 320. The sliding male/female joint 330 can be configured to move the blade housing 110 and the saw blade 130 in a linear direction or a non-linear (e.g., curved or angular) direction to, from, and/or between the retracted and extended positions while the first segment 312 and the second segment 314 slide or otherwise move along sliding male/female joint 330. For example, the guide track 316 (depicted in FIG. 5B) can be a female portion 326 of the sliding male/female joint 330 disposed in the first segment 312 of the extendable member 320 and a male portion 328 of the sliding male/female joint 330 can be disposed on the second segment 314 of the extendable member 320, as depicted in FIGS. 5F and 5G. In some exemplary configurations, the sliding male/female joint 330 can be or include a dovetail joint, a grooved dovetail joint, a tongue and groove joint, a pin and slot joint, derivatives or variations thereof, or any combination thereof. In some examples, the sliding male/female joint 330 can be a grooved dovetail joint, such that the male portion 328 can include a tongue 327 and the female portion 326 can include a groove 329, as depicted in FIG. 5G.

In another embodiment, actuator means can include a forward drive gear motor or actuator motor 340 which can be disposed on the extendable saw 300, such as on the main body 302. The actuator motor 340 can be configured to drive the extendable member 320 and can be operatively coupled to a rack gear 342 and a pinion gear 344 for driving the extendable member 320 for moving the blade housing and the saw blade between the retracted position and the extended position. The actuator motor 340 can include an electric motor (e.g., servo motor, stepper motor. direct current or alternating current motor), a hydraulic motor, a pneumatic motor (e.g., gas or air), a fuel-powered motor/engine (e.g., gasoline, diesel, or propane), or other similar device. The actuator motor 340 can include the same type or a different type of motor as the motor 124 and/or the motorized unit 140.

In one embodiment, the actuator motor 340 can be disposed on the main body 302, the pinion gear 344 can be disposed on the first segment 312 of the extendable member 320, and the rack gear 342 can be disposed on the second segment 314 of the extendable member 320. In another embodiment, the actuator motor 340 can be disposed on the main body 302, the pinion gear 344 can be disposed on the second segment 314 of the extendable member 320, and the rack gear 342 can be disposed on the first segment 312 of the extendable member 320. In another embodiment, the actuator motor 340 and the pinion gear 344 can be disposed on the first segment 312 of the extendable member 320 and the rack gear 342 can be disposed on the second segment 314 of the extendable member 320. In another embodiment, the actuator motor 340 and the pinion gear 344 can be disposed on the second segment 314 of the extendable member 320 and the rack gear 342 can be disposed on the first segment 312 of the extendable member 320. Various combinations of the actuator motor 340, the pinion gear 344, and the rack gear 342 may be used to effect the invention described herein.

The main body 302 can include at least one switchable magnet 350 having at least one contact surface 352 that can be adjustable or switchable between a magnetized state and a non-magnetized state. The switchable magnet 350 can include a magnet housing 354, two or more permanent magnets disposed within the magnet housing 354, at least one contact surface 352 that can be adjustable or switchable between a magnetized state and a non-magnetized state. The switchable magnet 350 can include a magnet housing 354, two or more permanent magnets disposed within the magnet housing 354, at least one contact surface 352 that can be adjustable or switchable between a magnetized state and a non-magnetized state. Lever 258 may extend from the magnet housing 354 for causing relative rotation of the permanent magnets and configured to control the magnetized state and the non-magnetized state of the contact surface 352. The control system means 158 may be operatively coupled to the extendable member 320, the motorized unit 140, and the electromagnet or switchable magnet 350. The control system means 158 can be configured to activate the magnetized state of the contact surface 352 prior to activating the rotation or other movement of the saw blade 130 via the motorized unit 140.

In some embodiments, the switchable magnet 350 can be an electromagnet configured to provide the magnetized state and the non-magnetized state from a power source (not shown). For example, the switchable magnet 350 can be an electromagnet in electrical communication with the power source via an electrical control switch, such as the switch 156. The switch 156 can be configured to control the magnetized state and the non-magnetized state of the contact surface 352 by providing an electrical contact in the circuit or by breaking the electrical contact in the circuit. In other embodiments, the switchable magnet 350 can include switchable permanent magnets configured to provide the magnetized state and the non-magnetized state of the contact surface 352. Depending on the type of magnets utilized in the switchable magnet 350, a magnet housing 354 can include various magnets (e.g., electromagnet or permanent magnets) and/or be a structural portion of the switchable magnet 350. For example, the switchable magnet 350 can include one or more electromagnets within the magnet housing 354 and the contact surface 352 of the electromagnet can be a lower surface of the magnet housing 354. In another example, the magnet housing 354 can be the outer surface of or other portion of one or more electromagnets that can form the switchable magnet 350 and the outer surface of the magnet housing 354 can be the contact surface 352.

In one or more embodiments, the magnet housing 354 can be or include one or more materials having a low magnetic reluctance and/or a high magnetic reluctance. The low magnetic reluctance materials can be ferrimagnetic or ferromagnetic ("magnetically susceptible material"). The high magnetic reluctance materials can include, for example aluminum, magnesium, and/or carbon fiber. In one or more embodiments, within the magnet housing 354, a first magnet or "lower magnet" can be held in a fixed position beneath a second magnet or "upper magnet" that can be rotated about its axis. In one or more embodiments, the lower surface of the lower magnet can form part of the contact surface 352 of the switchable magnet 350. In one or more embodiments, the lower surface of the lower magnet can be recessed within the magnet housing 354, such that the sides of the magnet housing 354 provide a gap between a lower surface of the lower magnet and the contact surface 352 of the switchable magnet 350.

The lever 258 (not shown in FIGS. 5A-G but shown in FIG. 4A) can rotate the second magnet relative to the first magnet within the magnet housing 354. The second magnet can include a notch or groove configured to engage or receive a bar (not shown) in communication with the lever 258. The bar can be received inside a groove formed on a boss (not shown) that can be connected to the lever 258. The lever 258 can have two or more positions, at least one of which can be an "on" position and at least one of which can be an "off" position.

In one or more embodiments, rotating the second magnet 180° about its axis can align the poles of both the first magnet and the second magnet in the "on" position to produce an external magnetic field. When so aligned, the north (positive) and south (negative) poles of the second magnet can substantially overlie the north and south poles of the first magnet, creating a strong external magnetic field about the magnet housing 354. In one or more embodiments, at least a portion of the strong external magnetic field can be directed towards the contact surface 352 of the switchable magnet 350. The extendable saw 300 can magnetically attach the contact surface 352 to a magnetically susceptible surface (not shown) when switched to the "on" position.

In one or more embodiments, the magnet housing 354 can be or include one, two, or more pole pieces that can enhance the magnetic functionality of the switchable magnet 350. The shape or wall thickness of the pole pieces forming the magnet housing 354 can increase or decrease the external magnetic field strength. For example, to provide a higher external magnetic field, the pole pieces can be shaped in such a way that they reflect the variation of the magnetic field strength around the perimeter of the permanently magnetized first and second magnets.

In one or more embodiments, the switchable magnet 350 can include one, two, three, four, five, or more independent switchable permanent magnets. In one or more embodiments, a switchable magnet 350 that includes a plurality of switchable permanent magnets disposed within the magnet housing 354 can be switched between the "on" and "off" positions via lever 258. In one or more embodiments, a switchable magnet 350 that includes a plurality of switchable magnets disposed within the magnet housing 354 can include two or more switches, handles, knobs, or levers 258 that can switch one or more of the switchable magnets between the "on" position and the "off" position.

In one or more embodiments, the magnet housing 354 can provide a waterproof and/or dustproof housing to protect the one or more switchable permanent magnets disposed therein. The switchable magnet 350 can be suitable for use in harsh, dusty, and/or wet environments. Additional details of a suitable switchable magnet 350 are further discussed and described in U.S. Pat. Nos. 6,707,360 and 7,012,495 and U.S. Patent Application No. 2004/0239460, which are incorporated by reference herein to the extent such disclosure is not inconsistent with this application and for all jurisdictions in which such incorporation is permitted.

In another embodiment, the switchable magnet 350 can include one, two, or more pole conduits, core elements, and/or combination carrier platter/core element assemblies (not shown) as one or more of the permanent magnets disposed within the magnet housing 354 and forming the contact surface 352. The magnet housing 354 and/or the permanent magnets can be or include one, two, or more pole conduits, core elements, and/or combination carrier platter/core element assemblies which can provide the contact surface 352 with a magnetized state ("on") and a non-magnetized state ("off") by the manipulation of the lever 258. In some examples, the lever 258 can be configured to cause relative rotation of the permanent magnets (and/or any portion of or any one, two, or more pole conduits, core elements, and/or combination carrier platter/core element assemblies) for controlling the magnetized state and the non-magnetized state of the contact surface 352. In other examples, instead of the lever 258, a switch, knob, handle, or lever can extend from the upper surface or other surface of the magnet housing 354 or the main body 302. The switch, knob, handle, or lever can be pulled, pushed, switched, turned, rotated, twisted, slid, in one or more directions to cause relative rotation of the permanent magnets (and/or any portion of or any one, two, or more pole conduits, core elements, and/or combination carrier platter/core element assemblies) for controlling the magnetized state and the non-magnetized state of the contact surface 352.

In some embodiments, the contact surface 352 and/or each of the permanent magnets can be or include a switchable core element-based permanent magnet apparatus, which contains two or more carrier platters having core elements. The core elements can be magnetically matched pole conduits attached to the north and south magnetic poles of one or more permanent magnets, inset into carrier platters. The pole conduits can include and redirect the magnetic field of the permanent magnets to the upper and lower faces of the carrier platters. By containing and redirecting the magnetic field within the pole conduits, like poles can have a simultaneous level of attraction and repulsion. Aligning upper core elements "in-phase" (e.g., north-north/south-south) with the lower core elements, can activate the apparatus and can provide the magnetized state ("on") by redirecting the combined magnetic fields of the pole conduits into the target. Anti-aligning upper core elements "out-of-phase" (e.g., north-south/south-north) with the lower core elements, can deactivate the apparatus and can provide the non-magnetized state ("off") resulting in pole conduits containing opposing fields.

In one or more embodiments, the switchable magnet 350 can include one, two, three, or more switchable core element-based permanent magnet apparatuses (not shown). Each switchable core element-based permanent magnet apparatus can include an upper carrier platter aligned above a lower carrier platter by a common axis. The upper carrier platter, the lower carrier platter, or both can be configured to be rotatable about the common axis for activating the magnetized and non-magnetized states of the at least one contact surface 352. The upper carrier platter can include two or more upper core elements having magnetically matched pole conduits and the lower carrier platters can include two or lower more core elements having magnetically matched pole conduits. The magnetically matched pole conduits of the upper core elements and the magnetically matched pole conduits of the lower core elements can be configured to be aligned, adjusted, or otherwise moved in phase to activate the magnetized state of the at least one contact surface 352 and configured to be anti-aligned, adjusted, or otherwise moved out of phase to activate the non-magnetized state of the at least one contact surface 352. Additional details of a suitable switchable magnet 350 is further discussed and described in U.S. Pat. Nos. 8,183,965, 8,256,098, and 8,350,663 (each by Inventor Jim G. Michael, assigned to Creative Engineering Solutions, Inc.), which are incorporated by reference herein to the extent such disclosure is not inconsistent with this application and for all jurisdictions in which such incorporation is permitted.

In operation, the extendable saw 100, 200, 300 can be disposed on one or more work surfaces (not shown) that contain one or more objects (not shown) to be cut and separated from the respective work surface. For example, the contact surface 152, 252, 352 of the switchable magnet 150, 250, 350 can be disposed on the work surface proximate to the object to be cut. The switchable magnet 150, 250, 350 can be switched from the "off" position to the "on" position via the switch 156 or the lever 258, thereby securing the extendable saw 100, 200, 300 to the work surface. Also, by actuating the switch 156 to activate the control system means 158, the blade housing 110 and the saw blade 130, or saw blade 130 alone, can be linearly or non-linearly advanced toward the object by the extendable member 120, 320 and/or activate the rotation or other blade movement of the saw blade 130 via the motorized unit 140. The extendable member 120, 320 can be linearly or non-linearly advanced horizontally along the work surface, such that the saw blade 130 contacts the object disposed on the work surface. The extendable member 120, 320 can apply the saw blade 130 with sufficient horizontal force directed towards the object so that the saw blade 130 can cut through the object via the combined horizontal force and the blade movement (e.g., rotation movement for circular blade) of the saw blade 130. The contact surface 152, 252, 352 of the switchable magnet 150, 250, 350 can remain in contact with the work surface while the extendable member 120, 320 exerts the horizontal force toward the object. The switch 156 can be actuated to retract the extendable member 120, 320 along with the blade housing 110 and the saw blade 130 or saw blade 130 alone, as well as to deactivate the rotation or other blade movement of the saw blade 130.

Figure 7A:
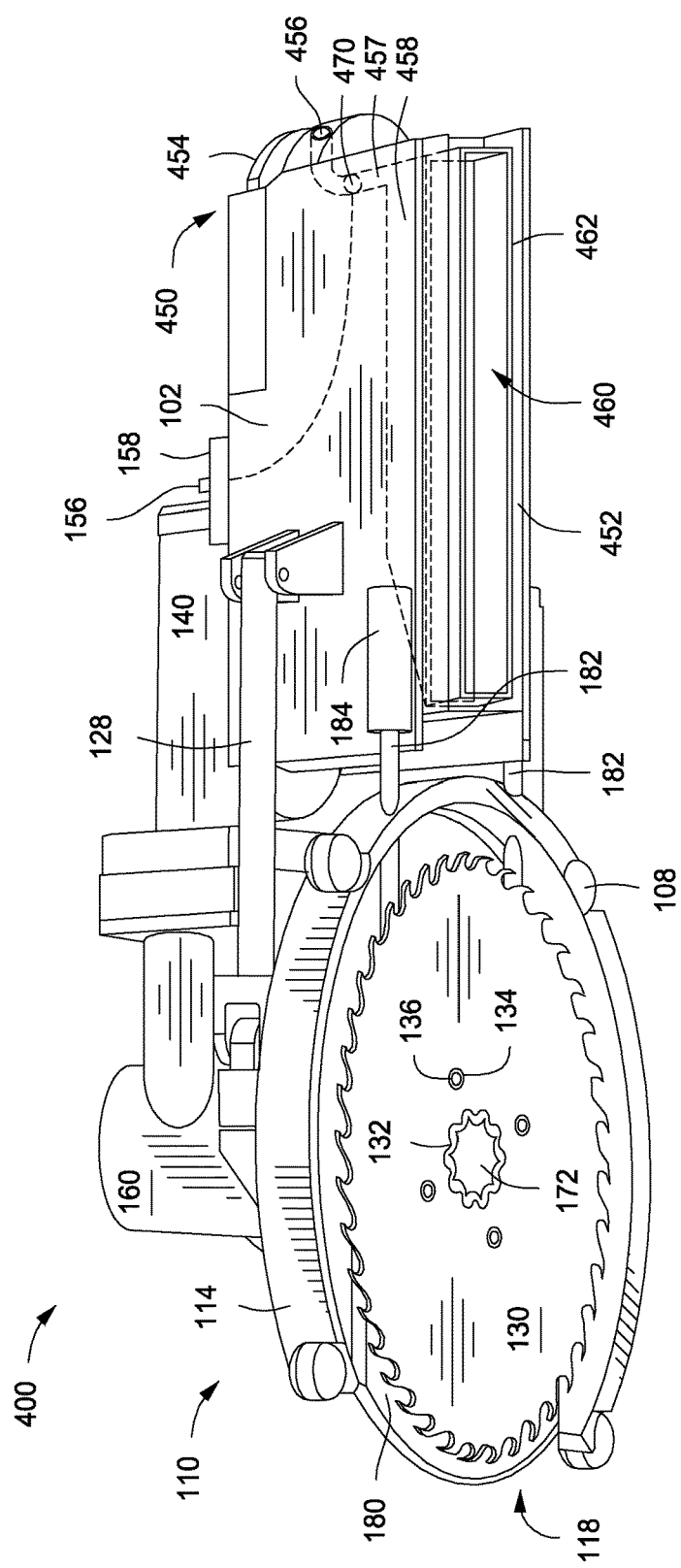
FIGS. 7A-7B depict perspective views of an illustrative vacuum-attachable and extendable saw, according to one or more embodiments described.
Figure 7B:
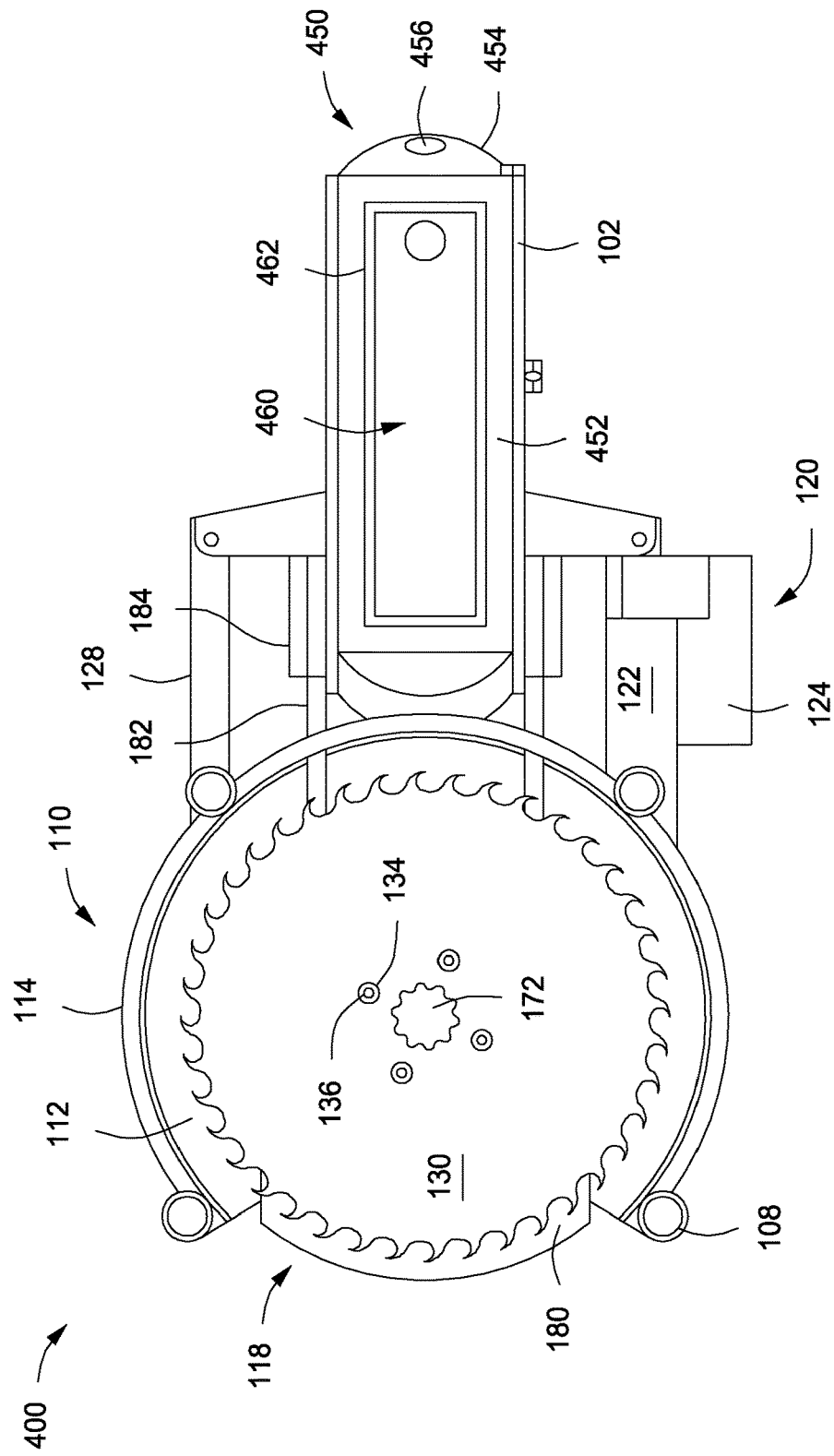

FIGS. 7A-7B depict perspective views of a vacuum-attachable and extendable saw 400, according to one or more embodiments. In one embodiment, the extendable saw 400 can include the main body 102, the blade housing 110, and the extendable member 120 as described for the extendable saw 100. The extendable saw 400 or portions thereof depicted in FIGS. 7A-7B and the extendable saw 100 or portions thereof depicted FIGS. 1A-3 share many common components. Like numerals shown in the Figures and discussed herein represent like components throughout the multiple embodiments disclosed herein.

Various methods of employing vacuum means or principles may be used, all of which are well known in the art. For example and without limitation, a "Venturi effect" may be employed with the use of pressurized or compressed air to create a vacuum. Various vacuum means or technologies well known in the art may be used. The manner in which a vacuum is created does not limit the scope of the claimed invention.

In one or more embodiments, the main body 102 can include at least one vacuum-attachable unit 450 having at least one contact surface 452 that can be adjustable or switchable between an evacuated state and a non-evacuated state. In some examples, the evacuated state can be considered an attached state and the non-evacuated state can be considered a released state. The contact surface 452 can contain one or more openings 460 and one or more seals 462, such as a gasket or an O-ring, surrounding each of the openings 460. The vacuum-attachable unit 450 can be disposed on and/or adhered to a work surface via the contact surface 452 by a generated vacuum.

In some embodiments, the vacuum-attachable unit 450 can also include a vacuum unit housing 454 having one or more vacuum ports 456 in fluid communication with the opening 460, as depicted in FIG. 7A. One end of the vacuum port 456 can be configured to couple to a vacuum line or hose via a fitting, a nozzle, or another type of adaptor (not shown). Such vacuum line or hose can be in fluid communication with a vacuum system (e.g., in-house vacuum or an independent vacuum) configured to generate a vacuum. The other end of the vacuum port 456 can be directly or indirectly in fluid communication with one or more openings 460. In one embodiment, the vacuum port 456 can be directly coupled to one or more openings 460.

In other embodiments, the vacuum-attachable unit 450 can also include one or more passageways 457 and/or one or more one or more vacuum chambers 458 directly or indirectly in fluid communication with and disposed between one or more vacuum ports 456 and one or more openings 460. In one embodiment, as depicted in FIG. 7A, the vacuum unit housing 454 can include the passageway 457 in fluid communication with and disposed between the vacuum port 456 and the vacuum chamber 458, and can include the vacuum chamber 458 in fluid communication with and disposed between the passageway 457 and the opening 460. The passageway 457 and/or the vacuum chamber 458 can independently be optional components which can be a single component or can be incorporated as a portion of the vacuum port 456 and/or the opening 460.

In some examples, the passageway 457 and/or the vacuum chamber 458 can independently be formed within the vacuum unit housing 454 or other portions of the vacuum-attachable unit 450. In other examples, the passageway 457 and/or the vacuum chamber 458 can independently be one or more pipes, hoses, lines, conduits, ducts, or the like. In another embodiment, a control valve 470 can be disposed between the vacuum port 456 and the opening 460 or can be disposed between the vacuum port 456 and the vacuum chamber 458. The control valve 470 can be configured to be placed in an opened-position and a closed-position and can be in operable communication with the control system means 158 and/or the switch 156. In one embodiment, the control valve 470 can be placed in the opened-position to provide a static vacuum or placed in the closed-position to provide a non-static vacuum. Both static and non-static vacuums can be utilized to maintain the evacuated state.

In some embodiments, the control system means 158 and/or the switch 156 can be operatively coupled to at least the motorized unit 140, the vacuum-attachable unit 450, and/or the extendable member 120. In one embodiment, the control system means 158 and/or the switch 156 can be configured to control the evacuated/non-evacuated states and the attached/released states. In operation, the extendable saw 400 can be disposed on one or more non-magnetically susceptible work surfaces and/or one or more magnetically susceptible work surfaces (not shown) that contain one or more objects (not shown) to be cut and separated from the respective work surface. For example, the contact surface 452 of the extendable saw 400 can be disposed on the work surface proximate to the object to be cut. The vacuum-attachable unit 450 can be switched from the "off" position to the "on" position via the switch 156, thereby securing the extendable saw 400 to the work surface. Also, by actuating the switch 156 to activate the control system means 158, the blade housing 110 and the saw blade 130, or saw blade 130 alone, can be linearly or non-linearly advanced toward the object by the extendable member 120 and/or activate the rotation or other blade movement of the saw blade 130 via the motorized unit 140. The extendable member 120 can be linearly or non-linearly advanced horizontally along the work surface, such that the saw blade 130 contacts the object disposed on the work surface. The extendable member 120 can apply the saw blade 130 with sufficient horizontal force directed towards the object so that the saw blade 130 can cut through the object via the combined horizontal force and the blade movement (e.g., rotation movement for circular blade) of the saw blade 130. The contact surface 452 of the vacuum-attachable unit 450 can remain in contact with the work surface while the extendable member 120 exerts the horizontal force toward the object. The switch 156 can be actuated to retract the extendable member 120 along with the blade housing 110 and the saw blade 130 or saw blade 130 alone, as well as to deactivate the rotation or other blade movement of the saw blade 130.

In another exemplary embodiment, a method for removing an object protruding from a work surface with an extendable saw can include positioning the extendable saw on or adjacent to the work surface, the extendable saw can include a main body, a blade housing coupled to the main body by at least one extendable member, where the blade housing at least partially covers a saw blade and the extendable member can be configured to move the blade housing and the saw blade, or the saw blade alone, between a retracted position and an extended position relative to the main body, a motorized unit coupled to the saw blade and configured to rotate or provide other blade movement to the saw blade, and means for attaching the extendable saw to the work surface.

Such means for attaching may be any means that may be employed by a person of ordinary skill in the art. Such means may include vacuum means. Such means also may include magnetic means which may employ a switchable or non-switchable magnet.

Where the attaching means employs a switchable magnet, such switchable magnet may be disposed on the main body and have at least one contact surface that can be adjustable or switchable between a magnetized state and a non-magnetized state. The method then comprises the further steps of attaching the extendable saw to the work surface by activating the switchable magnet to provide the magnetized state of the contact surface, rotating or providing other blade movement to the saw blade via the motorized unit, extending or otherwise moving the blade housing and the saw blade, or the saw blade alone, from the retracted position towards the object protruding from the work surface, where the object can be disposed to, from, and/or between the retracted and extended positions, and cutting through the object with the saw blade to separate the object from the work surface.

In some embodiments, the method can include using a constant or continuous motion when retracting, extending, or otherwise moving the blade housing and the saw blade, the saw blade alone, between the retracted position and the extended position. In some examples, a smoother or less rough work surface can be formed by the saw blade if the blade housing and the blade, or the blade alone, are moved with a constant or continuous motion between the retracted position and the extended position than if the blade housing and the blade, or the blade alone, are moved with an inconsistent or non-continuous motion between the retracted position and the extended position.

In some embodiments, the method can also include maintaining a blade guard in a stationary position as the blade housing and the saw blade, or the saw blade alone, extend from the retracted position so that the saw blade can be at least partially, substantially, or completely revealed or exposed within a cutting window of the blade housing as the saw blade moves away from the blade guard and the main body.

In other embodiments, the method can also include retracting or otherwise moving the blade housing and the saw blade, or the saw blade alone, to the retracted position subsequent to cutting through the object.

In some embodiments, the method can also include maintaining a blade guard in a stationary position as the blade housing and the saw blade, or the saw blade alone, move towards the retracted position so that the saw blade can be at least partially, substantially, or completely concealed or covered by the blade guard within the cutting window as the saw blade moves towards the blade guard and the main body.

In some embodiments, the method can also include a switchable magnet that comprises an electromagnet configured to provide the magnetized state and the non-magnetized state of the contact surface.

In other method embodiments, the switchable magnet can include a magnet housing, permanent magnets disposed within the magnet housing and configured to provide the magnetized state and the non-magnetized state of the contact surface, and a switch or a lever extending from the magnet housing and configured to cause relative rotation of the permanent magnets for controlling the magnetized state and the non-magnetized state of the contact surface.

In some embodiments, the work surface described can contain or can be any suitable magnetically susceptible material, which can include, but is not limited to, iron, steel, magnetically susceptible stainless steel, other ferrous metals, ferrous alloys, and combinations thereof. The magnetically susceptible material can be a composite material having both magnetically susceptible and non-magnetically susceptible components. In one or more embodiments, a non-magnetically susceptible work surface can be disposed on the magnetically susceptible work surface. The non-magnetically susceptible work surface can be thin enough to allow at least one of the switchable magnets, when in the "on" position to magnetically attach to the magnetically susceptible work surface.

In other embodiments, the work surface described can contain or can be any suitable non-magnetically susceptible material, which can include, but is not limited to, aluminum and aluminum alloys, titanium and titanium alloys, non-magnetically susceptible stainless steel, other non-ferrous metals or alloys, plastic, polymeric, or oligomeric materials, carbon-based or carbon fiber materials, masonry materials (e.g., concrete, brick, or stone), or combinations thereof. The non-magnetically susceptible material can be a composite material having both magnetically susceptible and non-magnetically susceptible components. In one or more embodiments, the extendable saw 400 can be attached to a non-magnetically susceptible work surface and/or the magnetically susceptible work surface.

The object to be cut by the extendable saw and the work surface can be made from the same material or different materials. The object to be cut can be metal, non-metal, or a combination thereof. The object to be cut and/or a non-magnetically susceptible work surface disposed on the magnetically susceptible work surface can be fiberglass, wood, plastic or polymeric materials, carbon-based or carbon fiber materials, and the like. In many embodiments, the object to be cut can be or include metal, such as steel pieces, angle irons, handrails, key plates, pipes, and other metal workpieces.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are exemplar illustrations and may not be construed as limitations.

Various terms have been defined above. To the extent a term used in a claim is not defined above, it should be given the broadest definition persons of ordinary skill in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention can be devised without departing from the basic scope thereof, and the scope thereof is determined by the claims that follow.

What is claimed is:

1. A method for using an attachable and extendable saw comprising the steps of:
    positioning the attachable and extendable saw on or adjacent to a work surface, the attachable and extendable saw comprising:
        a main body;
        a saw blade;
        a saw blade housing coupled to the main body by an extendable member,
        wherein the saw blade housing comprises an upper portion and a side portion providing for a cutting window,
        where the saw blade housing sits flat against a work surface and in a parallel plane to the work surface which holds an object to be cut by the saw blade,
        a saw blade guard that partially or completely covers the saw blade within the cutting window;
        wherein the saw blade guard extends and retracts about the object to be cut by the saw blade;
        wherein the extendable member is configured to move the saw blade in a linear direction between a retracted position and an extended position relative to the main body;
        a motorized unit coupled to the saw blade and configured to drive the saw blade by saw blade driving means;
        actuator means coupled to the extendable member and configured to drive the extendable member by extendable member driving means;
        attaching means disposed on the main body for attaching the attachable and extendable saw to the work surface;
        a control system operatively coupled to one or more of the extendable member, the motorized unit, and the attaching means; and two or more rollers disposed on the saw blade housing,
wherein the saw blade fits flat against said work surface holding the object to be cut, which object protrudes from the work surface;
attaching the attachable and extendable saw to the work surface by activating the attaching means;
driving the saw blade via the saw blade driving means;
driving the extendable member via extendable member driving means, wherein the saw blade with or without the blade housing is moved from the retracted position to the extended position towards the object to be cut;
controlling cutting the object with the saw blade with control system means operatively coupled to one or more of the extendable member, the motorized unit, the actuator means, and the attaching means; and
cutting the object with the saw blade.

2. An attachable and extendable saw comprising:
a main body;
a saw blade;
a saw blade housing coupled to the main body by an extendable member,
wherein the saw blade housing comprises an upper portion and a side portion providing for a cutting window,
wherein the saw blade housing sits flat against a work surface and in a parallel plane to the work surface which holds an object to be cut by the saw blade;
a saw blade guard that partially or completely covers the saw blade within the cutting window;
where the saw blade guard extends and retracts about the object to be cut by the saw blade;
wherein the extendable member is configured to move the saw blade in a linear direction between a retracted position and an extended position relative to the main body;
a motorized unit coupled to the saw blade and configured to drive the saw blade by saw blade driving means;
actuator means coupled to the extendable member and configured to drive the extendable member by extendable member driving means;
attaching means disposed on the main body for attaching the attachable and extendable saw to the work surface; and
a control system operatively coupled to one or more of the extendable member, the motorized unit, the actuator means, and the attaching means, and
two or more rollers disposed on the saw blade housing,
wherein the saw blade fits flat against said work surface holding the object to be cut, which object protrudes from the work surface.

3. The attachable and extendable saw of claim 2 wherein the extendable member is configured to move the saw blade with or without the blade housing between the retracted position and the extended position relative to the main body.

4. The attachable and extendable saw of claim 2 wherein the attaching means comprises one or more magnets disposed on the main body and comprising at least one contact surface.

5. The attachable and extendable saw of claim 4, wherein the one or more magnets comprises a magnet housing, one or more permanent magnets disposed within the magnet housing, and a lever extending from the magnet housing(s) for causing relative rotation of the permanent magnet or permanent magnets.

6. The attachable and extendable saw of claim 4 wherein the one or more switchable permanent magnets comprises one or more pole conduits, one or more core elements, or one or more combination carrier platter/core element assemblies.

7. The attachable and extendable saw of claim 2 wherein the attaching means comprises one or more switchable permanent magnets disposed on the main body and comprising at least one contact surface that is switchable between a magnetized state and a non-magnetized state.

8. The attachable and extendable saw of claim 2 wherein the attaching means comprises one or more electro-magnets disposed on the main body and comprising at least one contact surface that is switchable between a magnetized state and a non-magnetized state.

9. The attachable and extendable saw of claim 2 wherein the attaching means comprises one or more hybrid electro-permanent magnets disposed on the main body and comprising at least one contact surface that is switchable between a magnetized state and a non-magnetized state.

10. The attachable and extendable saw of claim 2 wherein the attaching means comprises vacuum means.

11. The attachable and extendable saw of claim 2 wherein the saw blade driving means comprises an electric motor, a hydraulic motor, a pneumatic motor, a fuel-powered motor, a fuel-powered engine, or other similar saw blade driving means.

12. The attachable and extendable saw of claim 2 wherein the extendable member driving means comprises manual operation, an electric motor, a hydraulic motor, a pneumatic motor, a fuel-powered motor, a fuel-powered engine, a combination thereof, or other similar extendable member driving means.

13. The attachable and extendable saw of claim 2 wherein the extendable member comprises:
a first segment coupled to the main body;
a second segment coupled to the blade housing; and
a guide track at least partially or fully disposed in the first segment or the second segment of the extendable member and configured to provide directional guidance to the blade housing and the saw blade between the retracted position and the extended position.

14. The attachable and extendable saw of claim 2 wherein the control system means is configured to move or maintain the extendable member in the retracted position and stop or prevent the motorized unit from driving the saw blade if the attachable and extendable saw becomes detached from the work surface.

* * * * *